United States Patent [19]

Slotznick

[11] Patent Number: 6,011,537
[45] Date of Patent: Jan. 4, 2000

[54] SYSTEM FOR DELIVERING AND SIMULTANEOUSLY DISPLAYING PRIMARY AND SECONDARY INFORMATION, AND FOR DISPLAYING ONLY THE SECONDARY INFORMATION DURING INTERSTITIAL SPACE

[76] Inventor: Benjamin Slotznick, 507 Third Street, Mt. Gretna, Pa. 17064

[21] Appl. No.: 09/014,345

[22] Filed: Jan. 27, 1998

Related U.S. Application Data

[60] Provisional application No. 60/036,465, Jan. 27, 1997, and provisional application No. 60/038,490, Feb. 24, 1997.

[51] Int. Cl.[7] .................................................. G09G 5/00
[52] U.S. Cl. ......................................... 345/115; 345/329
[58] Field of Search .................................... 345/115, 116, 345/112, 113, 114, 117, 118, 119, 120, 121, 127, 133, 356, 357, 328, 329, 333, 334, 335, 340, 348, 342, 345, 343

[56] References Cited

U.S. PATENT DOCUMENTS

| | | | |
|---|---|---|---|
| 5,029,104 | 7/1991 | Dodson et al. | 364/514 |
| 5,220,516 | 6/1993 | Dodson et al. | 364/514 |
| 5,404,505 | 4/1995 | Levinson | 395/600 |
| 5,572,643 | 11/1996 | Judson | 395/713 |

(List continued on next page.)

OTHER PUBLICATIONS

DiNucci, *Elements of Web Design*, Peachpit Press, Berkly, CA pp. 90–94, 124–131, 151–176, 1997.

International Search Report for PCT/US98/01280 mailed Oct. 9, 1998, 1 page.

Rosenthal, M. "HyperStitial Advertising—Streamix reinvents the commercial", *Web Review*, Aug. 29, 1997, Article downloaded from Streamix Press Release website (www.streamix.com/e4c5.htm) on Jan. 15, 1998, 2 pages.

About Streamix Systems web page, downloaded from Streamix website (www.streamix.com/e4a.htm) on Jan. 15, 1997, 2 pages.

Frequently Asked Questions, downloaded from Streamix Advertisers Main page website (www.streamix.com/e5.htm) on Jan. 15, 1997, 2 pages.

*Primary Examiner*—Steven Sax
*Attorney, Agent, or Firm*—Akin, Gump, Strauss, Hauer & Feld, L.L.P.

[57] ABSTRACT

A system is provided of displaying information at a display of a local user computer. The information includes primary information representing information requested by a user and secondary information representing additional information. The primary information is retrieved from a first information memory device, wherein there is a delay period between the request time and the time in which the primary information is available for display. The secondary information is retrieved from a second information memory device. The primary and secondary information are stored in a local storage device of the user's computer, such as the cache memory. A display controller causes the primary information to be displayed simultaneously with a portion of the secondary information on the user's display. When the user requests retrieval of subsequent primary information, a full display of the secondary information replaces the primary information in at least a portion of the delay time which occurs during retrieval of the subsequent primary information. The subsequently requested primary information is displayed after receipt thereof. The full display of secondary information is shown for a predetermined period of time, or may be held on the display by a user command. The user may also directly request a display of the full secondary information without requiring retrieval of subsequent primary information. The system may be implemented in an Internet environment wherein the primary and secondary information are retrieved from one or more remote websites. The portion of secondary information displayed which is simultaneously displayed with the primary information may be a thumbnail, keyhole or banner image of the full secondary information. The secondary information may be static, dynamic or user interactive.

51 Claims, 12 Drawing Sheets

U.S. PATENT DOCUMENTS

| | | | |
|---|---|---|---|
| 5,576,736 | 11/1996 | Miwa et al. | 345/189 |
| 5,602,565 | 2/1997 | Takeuchi | 345/119 |
| 5,634,850 | 6/1997 | Kitahara et al. | 463/33 |
| 5,680,150 | 10/1997 | Shimizu et al. | 345/115 |
| 5,706,502 | 1/1998 | Foley et al. | 395/610 |
| 5,731,805 | 3/1998 | Tognazzini et al. | 345/156 |
| 5,737,599 | 4/1998 | Rowe et al. | 395/615 |
| 5,737,619 | 4/1998 | Judson | 395/761 |
| 5,748,173 | 5/1998 | Gun | 345/115 |
| 5,831,589 | 11/1998 | Toriyama et al. | 345/112 |
| 5,831,591 | 11/1998 | Suh | 345/115 |
| 5,854,618 | 12/1998 | Kiwiet et al. | 345/115 |
| 5,856,821 | 1/1999 | Funahashi | 345/130 |

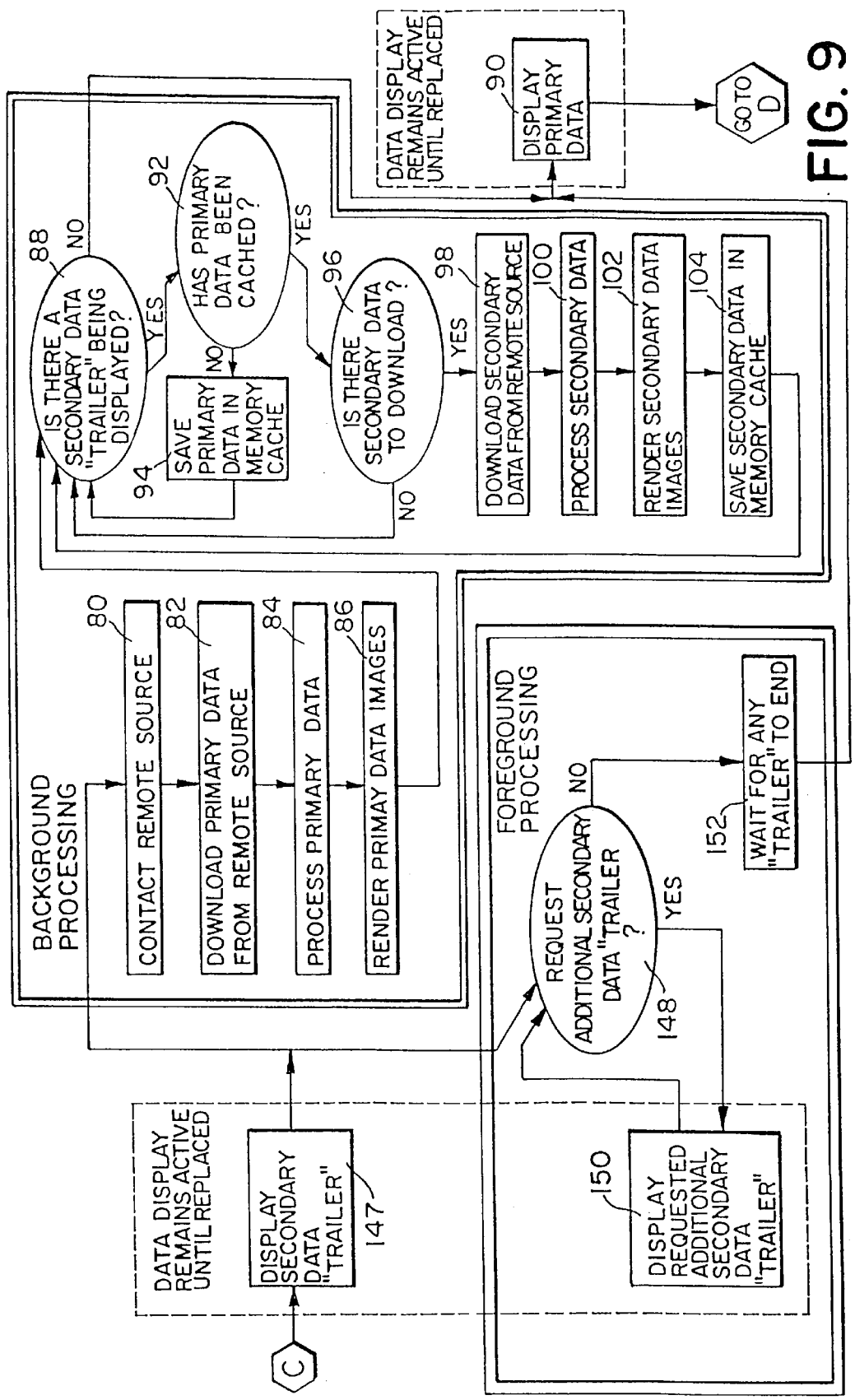

SYSTEM FOR DELIVERING AND SIMULTANEOUSLY DISPLAYING PRIMARY AND SECONDARY INFORMATION, AND FOR DISPLAYING ONLY THE SECONDARY INFORMATION DURING INTERSTITIAL SPACE

CROSS-REFERENCE TO RELATED APPLICATIONS

This application claims the benefit of U.S. Provisional Application No. 60/036,465, filed Jan. 27, 1997, entitled "APPARATUS FOR DELIVERING AND DISPLAYING SECONDARY INFORMATION," and also claims the benefit of U.S. Provisional Application No. 60/038,490, filed Feb. 24, 1997, entitled "APPARATUS FOR DELIVERING AND DISPLAYING SECONDARY INFORMATION."

BACKGROUND OF THE INVENTION

The present invention relates to an apparatus, device or method for delivering and displaying secondary information on a screen, monitor, audio-visual or other sensory display device. Most of the secondary information is not displayed until the user activates a display command or until the user is finished with the primary information. At that time the device displays the full secondary information in a near-instantaneous manner.

Some related concepts are used on the World Wide Web portion of the Internet. The Wide World Web is based upon the metaphor of pages. A computer downloads a body of information (a page) from a remote source. The page is displayed and contains links to other pages. Embedded in a link (but not visible to the user, except perhaps on the device's status line) is the address of a new piece of information. When a user clicks on a link (with a pointing device such as a mouse), the user's computer searches for and connects with the remote source holding the new piece of information. The new page is then downloaded to the user's computer. The page metaphor and the ability of linking between pages focuses upon a limited information in each page, with large amounts of information created by linking pages.

This metaphor is particularly apt and useful where the pages are created and stored upon one device (so that access and downloading are almost instantaneous) or closely linked devices with high-bandwidth interconnections (such as a company intranet or LAN), broad bandwidth interconnections that are very fast and high-tech (such as a T1 connection), or any situation which so minimizes search and wait times to be practically non-existent. On the other hand, most users of the Internet are not connected to the Internet by such a high-speed, high-bandwidth technology, so that searching and downloading pages involve considerable waiting time. While technological improvements are continually decreasing waiting time, enhancements to page content (such as real time audio and video) increase the information to be downloaded and hence increase wait time. In the context of waiting, the page metaphor tends to break down.

To reduce the perceived wait time, discrete parts of a page are frequently transmitted and displayed immediately as each arrives. For example, text is downloaded first and displayed, and the graphics or pictures that accompany the text follow and are displayed subsequently. This enables the user to begin to read the page or graphic before the complete graphic or picture information has been received, reducing the actual wait time. Pictures are sometimes displayed in a similar manner: a low resolution image is displayed while a higher resolution image is downloaded (sometimes consisting of interlaced graphic images). When the downloading is complete, the higher resolution image is displayed, replacing the low resolution image. Sometimes portions of a picture will be displayed at higher resolution, while the higher resolution for the remainder of the picture is being downloaded, and portions of the picture are then replaced with higher resolution versions as they are downloaded. A small picture may be shown, which if clicked will cause an enlargement to be downloaded, or decompressed.

Real time animation is sometimes presented in a similar manner. A picture will be downloaded. The subsequent frames of the animation will be downloaded into a memory cache in the user's computer (at times along with the software applet to display the animation). Each frame is displayed (one frame at a time) when its downloading is complete. When all frames have been downloaded, the animation will show one frame at a time. Some examples can be seen at the IsAlive website at http://www.itsalive.com.

Audio is sometimes presented similarly. It is downloaded and cached. When the downloading is complete, a set of audio controls pops up. When they are clicked, the audio is activated.

In addition, when Internet browsers access a new page, the previously displayed page is temporarily saved in a memory cache. This creates a "history" of the most recent portion of the log-on experience. Users may retrace their searches (or "history") like turning back pages in a book. (The "back" command re-displays the last previously displayed page.) However, because the back pages (or portions of them) have been cached, they appear nearly instantaneously, much quicker than downloading new pages.

The electronic magazine, Word™ (hereafter, "Word") (at http://www.word.com), combines this caching with a related idea. The table of contents is downloaded first. When a user clicks on a link from the table of contents to view a particular section or department, a small file is downloaded from the remote source and displayed for 5 seconds, while the rest of the article is accessed and downloaded. Because the initial file is small it downloads quickly. The screen display is an advertisement, informing the user that the following article is "sponsored" by some company. This device is designed to appear like "leaders" to motion pictures, short ads or previews that occur before a feature film starts. After having accessed a section or department in the magazine, the table of contents and "sponsor" screen may be cached as history. As the user reads various articles, returning now and again to the table of contents and re-accessing the sections, the sponsor screens will be displayed (from the cached history) as nearly instantaneous "leaders." However, these "leaders" are not instantaneous when first displayed. Moreover, for them to download quickly, they must be based on small files. In addition, these "leaders" will not display as a user leaves the Word website.

Another method frequently used to reduce user wait time for Internet downloading is to avoid large images and instead to show small low-resolution images (called "thumbnail" images). If a large resolution image is available, frequently a thumbnail image is still displayed first. When the thumbnail image is clicked or activated, the device downloads the larger image file from the remote source, which may entail significant wait time. (A user can avoid the wait time if he or she does not wish to see the larger version of the image.) Instead of a thumbnail version of the image, sometimes an icon (e.g. a picture of a camera) is displayed which indicates that an image will be downloaded when the icon is clicked or otherwise activated. (Once the image file for the icon is downloaded, it can be used repeatedly on the page without downloading more images or icons.) The larger image file is also frequently accessed by activating a hypertext link that describes the picture.

In contrast, some embodiments of the present invention display a thumbnail picture or icon with the primary information, and download the larger image as secondary information into memory cache while the user reads or listens to the primary information. The larger image is displayed instantaneously upon activation of the icon or thumbnail image.

Current methods sometimes reduce wait time by beginning a long page with an index which is linked to the body of the page instead of to some other pages. Clicking a link will almost instantaneously display the relevant part of the page. The other parts of the page can also be accessed by scrolling down from the index. If the user is scrolling through the article, he or she must necessarily pass every portion so indexed.

Although some software to construct and manipulate forms on personal computers, such as Microsoft's Access® and Visual Basic®, allows certain data entry into and manipulation of hidden or invisible forms, such practices have not been adapted for applications like Internet browsing which use a page metaphor. Under current Internet and desktop methods, when information is downloaded into a window, that window becomes active and is automatically displayed with the new downloaded information—on top of all other windows. This practice and methodology applies to applications a diverse as word processors, spreadsheets, help files, Internet browser pop-up windows, etc. Likewise, frames are expected to actively display their new contents.

To summarize current practice, all information is treated as primary information. Data that could be classified as secondary information is generally downloaded and displayed with primary information or downloaded in the foreground as a separate page of primary information. A small amount of graphic secondary information is hidden in Java® (hereafter, "Java") applets and shown with the primary information. Some audio-visuals require separate downloads to memory before being experienced. Some audio clips are downloaded into a memory cache for later listening.

A few exceptions to current practice have recently been developed. U.S. Pat. No. 5,572,643 (Judson), the entire disclosure of which is incorporated herein by reference, discloses methods of displaying otherwise hidden information objects when "linking" on the Internet. The time period from when a user clicks on a hyperlink in an Internet web page (to access a new web page) or directly requests a new web page to when the new web page has finished downloading to a user's computer and is displayed is often referred to as "interstitial space." Judson uses this interstitial space to display the hidden information. Judson discloses that the information object is preferably placed within a comment tag of a web page and thus is "ignored" by the browser when the requested web page is received and formatted for display. The information object, however, is saved to a separate file or cache within the user's computer. Judson also discloses that the information object need not be embedded within an existing web page, but rather may be embedded within the home page of the browser or supported elsewhere within the user's computer. In either embodiment of Judson, the information object is automatically displayed when the user clicks on a link to request a new web page.

Judson's scheme has a number of significant limitations. In Judson's scheme, the information object cannot be previewed when viewing the current web page, nor can it be directly accessed via the currently viewed web page. That is, Judson must wait for interstitial space to interact with the information object or with any information content related to the information object. Since the information object is intentionally hidden, the user may not even know that it will appear during a linking. This limits the functionality and effectiveness of the information object, particularly if it is an advertisement or the like that might benefit from a preview, teaser or an initial interaction while viewing the current web page. Furthermore, Judson's disclosure is limited to an Internet environment, and no disclosure is provided to explain how the idea could be implemented in non-Internet environments where communication occurs between client and server computers, or local computers and remote information storage locations.

Other Internet programs (whether embedded in web sites or service provider access software) spawn windows that remain on the screen even though new web pages are accessed. Windows which show advertisements are common. The windows remain on the screen both during the time that the pages are downloading and after the new pages are downloaded. These programs do not automatically spawn at or during interstitial time, nor do they end at the conclusion of the interstitial time.

Despite attempts in the prior art to find ways to take advantage of interstitial space, there is still a need for methods and apparatus which more effectively use interstitial space. The present invention fulfills this need.

BRIEF SUMMARY OF THE PRESENT INVENTION

A system is provided of displaying information at a display of a local user computer. The information includes primary information representing information requested by a user and secondary information representing additional information. The primary information is retrieved from a first information memory device, wherein there is a delay period between the request time and the time in which the primary information is available for display. The secondary information is retrieved from a second information memory device. The primary and secondary information is stored in a local storage device of the user's computer, such as the cache memory. A display controller causes the primary information to be displayed simultaneously with a portion of the secondary information on the user's display. When the user requests retrieval of subsequent primary information, a full display of the secondary information replaces the primary information in at least a portion of the delay time which occurs during retrieval of the subsequent primary information. The subsequently requested information is displayed after receipt thereof. The full display of secondary information is shown for a predetermined period of time, or may be held on the display by a user command. The user may also directly request a display of the full secondary information without requiring retrieval of subsequent primary information. The system may be implemented in an Internet environment wherein the primary and secondary information are retrieved from one or more remote websites. The portion of secondary information displayed which is simultaneously displayed with the primary information may be a thumbnail, keyhole or banner image of the full secondary information. The secondary information may be static, dynamic or user interactive.

BRIEF DESCRIPTION OF THE DRAWINGS

The following detailed description of preferred embodiments of the present invention would be better understood when read in conjunction with the appended drawings. For the purpose of illustrating the present invention, there is shown in the drawings embodiments which are presently preferred. It should be understood, however that the present invention is not limited to the precise arrangements and instrumentalities shown. In the drawings:

FIG. 9 is a continuation of FIG. 8, which shows a flow diagram of a method for displaying secondary trailer information while accessing and processing a new body of primary information via a method shown in the flow diagram of FIG. 7, in accordance with a device of FIG. 3;

FIGS. 10A and 10B are sample screen displays in an Internet application of the present invention, wherein FIG. 10A shows the screen after primary information is retrieved, but during retrieval of the secondary information, and FIG. 10B shows the screen subsequent to retrieval of the secondary information;

DETAILED DESCRIPTION OF THE INVENTION

Figure 1:
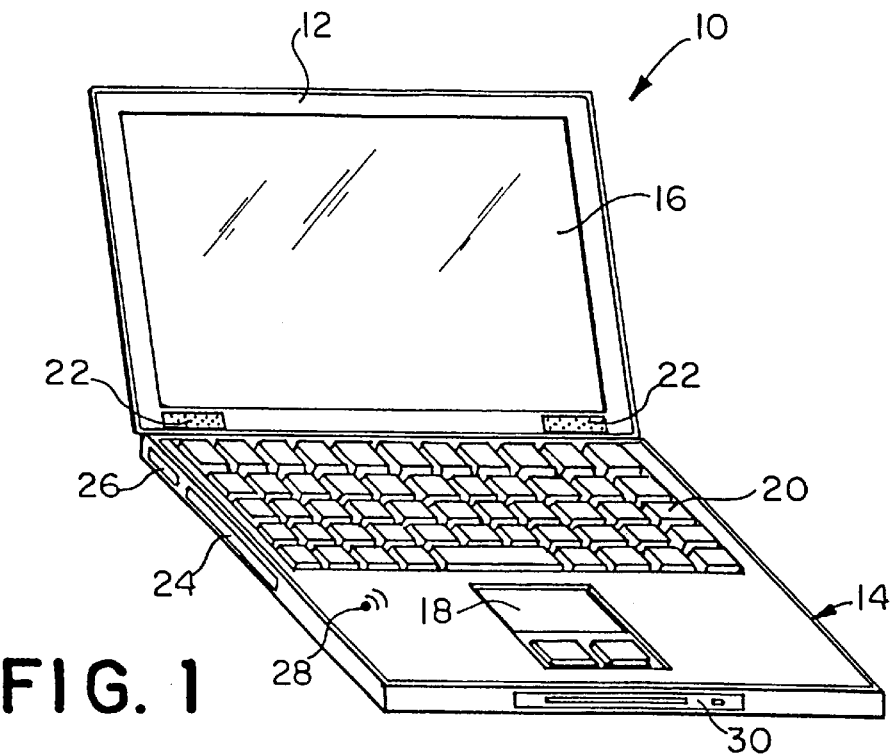
FIG. 1 is a perspective view of a stand-alone electronic apparatus for displaying primary and secondary information, in accordance with a first embodiment of the present invention.

Certain terminology is used herein for convenience only and is not to be taken as a limitation on the present invention. In the drawings, the same reference numerals are employed for designating the same elements throughout the several figures.

Definitions

The below described apparatus in accordance with the present invention is a stand-alone or interconnected device with electronic components for viewing both primary and alternate (at times fully or partially hidden) secondary information from present or remote sources. In some embodiments, the apparatus accesses and downloads the information in the form of pages, and displays the information in the form of pages and virtual pages™ (hereafter, "virtual pages"). At times the embodiments access, download and process secondary information in the background while the device displays and monitors primary information in the foreground, and visa versa (i.e. at times accessing, downloading and processing primary information in the background while the device displays and monitors secondary information in the foreground). Some embodiments of the present invention may also filter secondary information, in some instances replacing one piece of secondary information with another.

In this document, the term "stand-alone device" refers to devices including (but not limited to) hand-held electronic devices, desktop electronic devices (such as electronic clocks or rolodexes), vending machines, and kiosks. Input devices include alphanumeric keypads, numeric keypads, pointing devices (including but not limited to track balls, mouse pointers, and touch pads), touch screens, handwriting input pressure pads or light pens, various digitizer pads, scanners (including those for graphics, text and handwriting), optical character recognition modules, handwriting recognition modules and voice recognition modules.

The term "stand-alone" device also refers to devices which automatically transmit to or receive data from third parties regardless of the manner of transmission.

The essence of this type of stand alone device being that the display of information is performed by the device without need of the data transmission. For example, a desktop personal computer with automatic telephone dialer that also electronically displays primary and secondary information would be a stand-alone device in those instances in which the telephone is not active or in which data transmission (e.g. via telephone link) is not related to the display of primary and secondary information.

The term "interconnected device" refers to devices which perform the same functions as the aforementioned stand-alone device, but which distribute the physical and electronic components among two or more locations and connect those components so that electronically encoded data can pass between and among them. Connection, for example, includes via wire, conduit or other substance through which electrical signals can pass, fiber-optic cables or other material through which light waves or other electromagnetic radiation can pass, via air or vacuum through which radio or other electromagnetic waves can pass and the like. Connection includes any combination of the above, as well. An example of an interconnected device is a device similar to the stand-alone device, but with an essential component located nearby. The essential component might be a credit card verifier, a printer, a second keyboard for debugging, etc. Similarly several otherwise stand-alone devices located in one business facility, store, home or shopping mall might share a single printer, a single modem for transmitting and dispensing electronic items, a single central processing unit, etc. The term includes systems in which the central processing unit is not located in one place but rather is distributed, where input is distributed, and where memory and data storage may be separate from the computational components (which themselves may be centrally located, located at various central places or distributed.) In other words, parts of the computations may be performed at different locations and parts of data may be stored at different locations. Computation and memory systems may include but need not include redundancies. The term interconnected device includes both hardwired components, and networked systems of components. The term includes but is not limited to systems of mainframes connected to dumb or smart terminals, personal computers or workstations, systems of client/servers connected to personal computers and workstations, and mixtures of such systems. The term interconnected device includes distributing the components over a network of networks such as the Internet. The term includes on-line computer access, interactive television access, and telephone access, where the input is through components (including but not limited to personal computers, interactive televisions, telephones, pagers, electronic organizers, electronic Rolodexes, personal digital assistants, ATM money machines, fax machines, scanners, and handwriting input devices) owned by various parties and possibly used for other purposes which may not be covered by the present invention. This term applies regardless of which part of the accessing, downloading, processing, rendering, storing or displaying of the information is distributed. As such, the term interconnected device includes software and/or hardware which enables a personal computer, interactive television or telephone or other home or office machine or appliance to become part of an interconnected device for the purposes contained herein or enable such machines to simulate the workings of a stand-alone device or an interconnected device for the purposes contained herein. The term also includes software regardless of how distributed, and whether hardwired into the machine, hard coded into its operating system, written to hard disk or permanent memory, or into temporary storage (including but not limited to CD-ROM and floppy disk), or temporarily residing in the machine via Java-type applet downloaded from a server or off a network such as the Internet.

The term "interconnected device" includes software and/or hardware which enables a user, a sensing device, computer (or other) hardware, or software to display primary and secondary information as if it were an interconnected device or an object which simulates the workings and/or actions of an interconnected device, even though owned by various parties and possibly used for other purposes which may not be covered by the present invention. For example, to the extent that off-the-self software such as (but not limited to) relational databases or spreadsheets display secondary information on an interconnected device, or link an apparatus with another program, or call a function, module, procedure, subroutine, etc. which acts as an interconnected device, or itself triggers or displays secondary information on or embeds or links an apparatus with an interconnected device, the off-the-shelf software during such triggering, delegating, embedding or calling is part of an interconnected device, even though for other purposes the off-the-shelf software might not be covered by the present invention. An interconnected device includes a device which connects to more than one interconnected device. The term interconnected device includes the situation when two or more interconnected devices link or communicate with one another, including ascertaining tasks, breaking the tasks into smaller parts, and distributing the partial tasks between or among the interconnected devices in forms of inter-device task delegation and also including situations in which the several interconnected devices must provide each other with information on a one time, repeated or on-going basis in order to accomplish the display of secondary information or its partial components.

The terms "stand-alone" device and "interconnected" device also refer to devices which display secondary information or incorporate modules that display secondary information even though the devices may also (or even primarily) perform a variety of functions or tasks that are not the subject of the present invention.

In this document, the term "information" refers to data of any form or substance including (but not limited to) text, graphics, images (still, moving, animated, etc.), film or other animated images (including "loops" which replay the animated sequence repeatedly), audio clips, charts, spread sheets, databases, wallpaper (tiled, full-screen, static, moving, etc.), screen-savers, windows, Object Linking and Embedding ("OLE™" (hereafter, "OLE")) objects (either linked or embedded), tables, frames, software (in any form, language or code), programs, scripts, applications or applets, data addresses, any data in encoded or compressed form, etc., whether hidden or displayed, whether or not containing links to other data or information.

The term "page" refers to a body of data that is accessed and downloaded in a generally continuous process from a memory or a remote source. The term is frequently used to refer to the body of data downloaded at one time over the Internet from a remote server. A page may contain more information than can be displayed at one time on the screen of the device. A page may contain a number of separate and/or linked files. A page may contain both primary and secondary data. The data contained in a page may take any form including, but not limited to, text, images (still, moving, animated, etc.), film or other animated images (including "loops" which replay the animated sequence repeatedly), audio clips, charts, spread sheets, databases, wallpaper (tiled, full-screen, static, moving, etc.), screen-savers, windows, OLE objects (either linked or embedded), tables, frames, software (in any form, language or code), programs, scripts, applications or applets, data addresses, any data in encoded or compressed form, etc., whether hidden or displayed. Every page is a body of data that has a computer, server and/or memory address. A page may be accessed by entering its address and instructing the computer to access and retrieve the information at that address. A page may have links to other pages. A link to another page contains the address of that other page which address is not necessarily displayed, but is attached in the underlying data to portions of the displayed data. The link may be attached, for example (but not limited to), to portions of displayed text (usually highlighted or displayed in bold type and referred to as "hypertext"), images, buttons (a real button or merely the image of a button shown on a screen), or to other sensory input devices. When the portion of the screen (text, image, etc.) which "contains" the linked address is activated by a pointing device or touch screen, or a real button referring to a typed in address is activated, or other accessing command is executed, the apparatus instructs the computer to access the linked address and download the associated page. Current use on the Internet displays all or most of a downloaded page (the big exceptions being Java applets and animated images, in which all frames are displayed, but only one frame at a time, and audio, in which a user may elect to hear in real time one "sound" frame at a time). This is consistent with and a result of the page paradigm that the linking features allow the user to access a large variety of additional information via additional or subsequent pages, so that the additional data will be downloaded from the link address only when the page it is on is specified.

In this document, the term "virtual page™" (hereafter, "virtual page") refers to a portion of a page that is displayed as if it were a complete page. For example, the present invention displays the primary data as a virtual page™ while the secondary data (or much of it) is held in memory without being displayed. The secondary data consists of one or more virtual pages™ which are displayed one at a time. A secondary data virtual page™ is accessed in a similar manner as a page is accessed. The user activates an object or device (on the screen, on the keyboard, in the computer, etc.) or issues a command, which is linked to the memory cache or a portion of the memory cache. The requested virtual page™ will be displayed as if it were a page that had been accessed from a dedicated server via an extremely fast and broad bandwidth connection. Different parts of the primary data may be linked with different virtual pages™. A virtual page™ may be linked to another virtual page™ within the secondary data of its page. A virtual page™ may be linked to other pages and other primary data, including pages and data at various remote sources. Any type of data or display contained in a page, may be contained in a virtual page™. The present invention may display a virtual page™ and then continue to display it until the user issues another instruction to the present invention, or the present invention may display the virtual page™ for only a pre-specified time (pre-specified in some cases by the program and in some cases by the user) such as 5 seconds at which time the present invention takes other action (such as redisplaying a previous virtual page™ or a newly requested other page). For example, the apparatus may display a virtual page™ for 5 seconds while the a new page is downloaded, and then automatically display the primary data of the new page.

In this document, the term "trailer" or "trailing page" refers to a virtual page™ (or virtual pages™) displayed automatically without user input while the apparatus is accessing and downloading a new page, or otherwise quitting the current page (including quitting the current page by returning to a prior page, exiting the program or network, logging off the program or apparatus, etc.). In other embodiments (or pages), this is the only time the apparatus displays a trailing page. In other embodiments (or pages), a virtual page™ (or virtual pages™) that a user displays on command also functions as a trailing page. A trailing page may consist of one or more linked virtual pages™.

In this document, the term "primary data" refers to the virtual page™ that is automatically displayed (and first displayed) when a page is downloaded by the apparatus. The term "secondary data" refers to the data contained in all other information and all other virtual pages™ in a page (i.e. all data in a page other than the primary data) which is downloaded and stored in memory.

Figure 4:
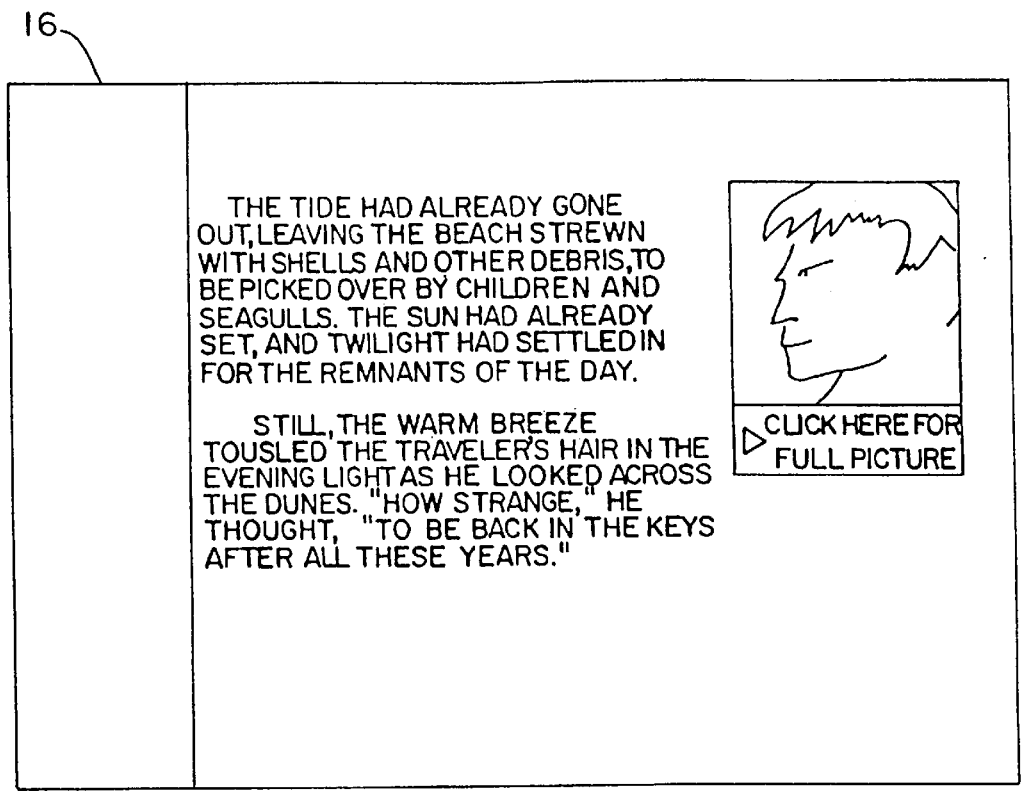
FIG. 4 is an illustration of a representative screen displaying primary textual information on an electronic device, a personal computer or an interactive television, which contains a "keyhole" image to access and display secondary information in accordance with a remote device of FIG. 3.

In this document, the term "keyhole" or "keyhole image" or "keyhole picture" refers to a portion of an image, picture or document that is embedded in another image, picture, document or screen display. In the particular context of this invention, a "keyhole" is a portion of a virtual page™ that is embedded in another virtual page™, so that clicking on the "keyhole" (or its caption) or otherwise activating the "keyhole" displays (e.g. unlocks) the entire virtual page™ of which the "keyhole" is a part. In some embodiments, the position of the "keyhole" in both virtual pages™ is the same—that is activating or unlocking the "keyhole" will change every part of the screen display except the "keyhole," which will remain the same. A "keyhole image" is shown in FIG. 4 (discussed below).

The term "keyhole ad" or "keyhole advertisement" refers to linked virtual pages™ in which activating a keyhole image on one virtual page™ causes the display of another virtual page™ which consists of advertising copy, such as would appear in a magazine display advertisement or a television commercial.

The term "in the foreground" means that the processing is a visible, sensory and evident process for the user (also referred to as "foreground processing"). The term "in the background" means that the processing occurs without being sensed or experienced by the user (also referred to as "background processing"). When priority is an issue, a task that is being done in the foreground has priority over a task being done in the background. The terms presuppose that two things are happening at the same time: one thing is happening in the foreground while another thing is happening in the background.

There are various way in which this may be done, as recognized by those skilled in the art.

As an example: two processes may occur at the same time if there are two independent processing circuits tied to the system clock, so that the processes do in fact occur simultaneously. This is called "parallel processing." The processing circuits may be in the same microchip or separate chips, on the same card or board or separate cards or boards. For example, computers that perform tasks that take intensive processing time, such as video, audio, speech recognition, and CAD rendering, frequently have special parallel processing circuits hardwired for those capabilities.

An alternative example simulates parallel processing by what is called "multi-tasking" or "multi-threading." Multitasking is like juggling several tasks, none of which need the device's full attention. Part of the task with the highest priority is done first, then while the device is waiting for a response, part of another task is done. The device "moves" back and forth between the tasks, working on them a piece at a time, remembering how much of each task had been done, and what was left to do. For example, of the tasks undertaken by the present invention, display of previously processed data (e.g. audio and/or video) does not require the device's full attention. Likewise, downloading and processing data from a low bandwidth connection and/or using a "slow" modem does not require the device's full attention. For example, when the device places a static (or moving) image on the screen, many processing cycles must pass before the image must be refreshed (or replaced). During these cycles, the device may perform other tasks, such as downloading data from a remote source, or regularly checking for additional user input. These other tasks will be interrupted when the device refreshes the screen, after which the device will return to these other tasks and continue with them where they were interrupted. In this manner, a single processor may work on several tasks at once.

Overview of Present Invention

In contrast to the prior art discussed above, the apparatus, device or method of the present invention reduces user wait time and machine wait time by distinguishing secondary information from primary information and treating each differently, as follows:

1. Secondary information is downloaded and stored in fast memory, while primary information is experienced.
2. Secondary information is fully or partially hidden until triggered.
3. Secondary information is triggered and displayed as if it were a separate page.
4. Secondary information is triggered not only by hypertext, icons, controls and thumbnail images, but also by keyhole images.
5. Secondary information is also displayed automatically as a trailer while new primary information is retrieved or while the user is logging-off.

In one embodiment of the present invention, the device displays the secondary information like a movie trailer: shown after the end of one featured attraction, prior to the second featured attraction, while the second featured attraction is being readied for display. In another embodiment, the device displays the secondary information like opening a door after peeking in the keyhole: when a key, icon, control or part of an image is activated. In still another embodiment, the device displays the secondary information when the user activates a miniature version (or thumbnail image) of the visual portion of the secondary information. The secondary information may also be displayed upon activation of other controls or hypertext.

The present invention effectively uses time that would otherwise be wasted by either machine or user. Consider the following situation. In the prior art, when a user reads text on a screen (or otherwise listens to or senses information played or displayed), many machines wait idly for the user's next command. (This is referred to herein as "machine wait time"). Also with prior art, when many machines attack a process-intensive task, such machines force the user to wait idly for the machine to complete the job and display the processed data. (This is referred to herein as "user wait time").

The present invention (a) uses what would otherwise be machine wait time to retrieve and process secondary information and (b) uses what would otherwise be user wait time to display secondary information.

More particularly, with the present invention, while a user is reading text on a screen (or otherwise experiencing displayed data), the device gets and processes secondary data—thereby reducing machine wait time. When the user wishes to see (or experience) the secondary data, that data does not have to be retrieved and processed, so that upon user command it will be displayed nearly instantaneously—thereby reducing user wait time. In addition, while the device is getting and processing additional primary data, the user can read (or experience) secondary data previously retrieved—also reducing user wait time.

The present invention retrieves, processes and displays more information in a given time period. In doing so, the present invention gives the appearance of near-instantaneous accessing, downloading, processing, and/or rendering information even when the time it takes to do so is in fact slow. To accomplish this, the present invention utilizes fast memory in a local cache or buffer in the device.

The present invention downloads the secondary information to (or accesses the secondary information and stores it in) a local buffer or cache memory in the device after the primary information has been accessed and downloaded, while the primary information is being viewed or heard. Further processing and/or rendering of the secondary information is accomplished while the primary information is being viewed or heard. Accessing, downloading, processing and/or rendering the secondary information occurs in the "background" (at times through multi-tasking or multi-threading) and is not noticeable to the user. The secondary information can then be viewed (and/or heard) either at will with no waiting period, or while the next primary information is being accessed, downloaded, processed and/or rendered.

Because access to the local buffer or cache memory is quick, displaying the secondary information occurs almost instantaneously. If the secondary information is sensed, viewed and/or heard while the next portion of primary information is being accessed and prepared for display, the user perceives the preparation time for the next portion of primary information as being shorter than it actually is (or even non-existent), and the flow of information appears more seamless.

Many resource intensive applications illustrate the delays caused by accessing and processing information. Image processing is a common application that entails significant access or preparation time lags. Examples include: rendering CAD drawings (even if stored on a local quick access memory) and transmitting images, animation and video clips between remote sources. Sound processing requires similar allocation of system resources, resulting in preparation time lags. Examples include processing high quality stereo sound and transmitting audio clips between remote sources. Network applications, such as use of the Internet, highlight preparation delays caused by accessing, log-in and downloading information from remote sources. Rapid and continuing changes in Internet software technologies frequently require a user to download from a remote source (e.g. a website) either new software or a revision or upgrade to the user's existing software in order to view, receive, display or download other data or information from that remote source (or some other remote source). Examples include downloading the latest version of Apple's QuickTime® or Macromedia's Shockwave™ to view film clips and/or downloading the latest version of RealAudio® to hear audio clips. Stand-alone applications such as large spreadsheets or large database searches highlight processing delays found in extensive mathematical calculations.

These processing lags continue to plague various applications. Although processing speeds, transmission bandwidth and transmission speeds have been increasing, they are not infinite, and both application complexity and software technologies continue to grow at a similar pace.

In one embodiment of the present invention, the secondary information is displayed while the user is accessing and downloading the next quantum (or portion) of primary information from a remote source. When using the Internet, for example, accessing a remote server for a new page frequently takes seconds or minutes, downloading that page frequently takes seconds or minutes more, and decompressing information may entail even longer waits. During this user wait time which the user would otherwise waste, the secondary information that accompanied the previous primary information (i.e. from a prior accessed website) is automatically processed, stored, displayed, viewed and heard. By putting waiting time to productive use, the present invention significantly increases the amount of information that is accessed and displayed during any log-in session.

The information may be static or contain moving images with or without sound. In that instance, the secondary information will seem like a movie trailer for coming attractions (or a very short television commercial spot). The secondary information could contain supplemental material such as charts, editorial content, follow-up sources or advertisements. The secondary information may include software applications, scripts or programs such as new software or software revisions, supplements or upgrades necessary to process this or other data or information.

Although in this embodiment, the information is displayed primarily while the user would otherwise be wasting time waiting, the user controls how long the secondary information will be displayed. For example, the user might find the information particularly useful or interesting and want to examine it further. The user need only instruct the device to "hold" (e.g. by pressing a physical "hold" button, typing a "hold" command, clicking or otherwise pointing to an onscreen button or menu item, speaking a command to a device equipped with a voice recognition module, etc.) In such case, the secondary information remains displayed while the new primary information is downloaded into the local cache or buffer. When the user is finished absorbing the secondary information, the user need only provide an instruction and the device quickly displays the new primary information. (The new primary information may have secondary information of its own which follows into the buffer immediately after the new primary information.).

In many instances, instructing the device to hold while the user examines the secondary information will not increase the total log-on time. This is because many websites begin displaying primary information piece by piece in an effort to reduce the user-perceived wait time. Yet, frequently, a long wait is still required before one can usefully begin to read the screen. During this time, the user could be viewing the secondary information from the previous web page. When the new page is substantially completely downloaded the status bar displays that the downloading is "done". This signals the device (or the user) to display the new page (or that the new primary page is ready to be viewed). Because the new page has already been completely downloaded into cache memory, it appears (completely in full) instantaneously. The user fully absorbs the secondary information from the previous web page, with no additional log-in time, and with shortened (if not eliminated) disturbing waiting periods.

The invention is particularly suited to the Internet format in which only a small quantity (or quantum or portion) of primary information (called a "page") is downloaded from a remote source at a time, downloading times are long, and further quantities (quanta, or portions) of primary information are not necessarily expected to come from the same remote source (due to links between pages called "hyperlinks") but rather from other remote sources as well.

Another embodiment allows the user to display the secondary information full screen at will by pressing or clicking a control or button. (Such controls could be physical buttons such as fast forward buttons on a tape recorder, or "virtual" controls, such as images of buttons on a computer screen.) The button could be clearly labeled to indicate that the secondary information will be displayed quickly, if not instantaneously.

One version of this embodiment would show part (perhaps a small part) of the visual portion of the secondary information at full size (the "keyhole" view). When the control is activated, the viewed portion of the secondary information is expanded so that the entire secondary information is displayed. A given quantum (portion or quantity) of secondary information may have more than one keyhole. In other words, the screen may display two or more keyholes that access the same screen of secondary information, where each keyhole shows a different part of the secondary screen. A given quantum or body of primary information may show keyholes for more than one piece (or more than one quantum) of secondary information. In other words, a screen of primary information may contain several images or keyholes, each of which accesses a different screen of secondary information. More generally, the memory cache may store a number of secondary information screens linked with the primary information in a variety of ways.

The secondary information accessed by a keyhole may be static, or contain moving images with or without sound or multi-media. The screen of secondary information may have its own links, or may return the user back to the primary information or link to the next primary information. The quantum of secondary information (e.g. screen or screens, etc.) may automatically return the user to the primary information after a set time period or allow the user to continue to view, listen or otherwise sense the secondary information via a "hold" button or device as discussed above. Alternatively the quantum or body of secondary information (e.g. screen or screens, etc.) may remain active until the user chooses (by activating a control) to return to the primary information or go on to the next primary information.

In still another embodiment, the device displays with the primary information, a miniature version (called a "thumbnail image") of the visual portion of the secondary information. When the user activates the thumbnail image, the secondary information is displayed at full size.

An alternative embodiment may display a report in electronic form which contains graphs, spreadsheets, CAD drawings or other audio, visuals or multi-media appended to particular screens or sets of data. These appended "illustrations" need not be displayed in full, but may be processed in the background while the user is perusing the textual body of the report, and stored in the memory cache If the user activates a control or icon indicating the existence of appended secondary information, it will be immediately shown without need for further processing.

In some embodiments, software (whether new to the user, or an upgrade to the user's existing software) needed to process, store and/or display secondary (and/or other) information is downloaded from a remote source with (or as) secondary information. Such software may be software code which does not permanently reside in the user's device (e.g. a Java applet) but which remains in the user's device only while the secondary information is processed and displayed. Alternatively the software may be stored permanently in the user's device, in which case, the device downloads the software code directly to the device's long term or permanent memory or the moves the software code from the fast memory cache into which it has been downloaded into the device's long term or permanent memory storage.

In the same way, secondary information from a remote source for permanent storage is downloaded in the background either directly into the device's long term or permanent memory in the user's device or is downloaded into the fast memory cache and moved from the quick memory cache to long term or permanent memory in the user's device.

In an alternative embodiment, the device treats information as being downloaded into a "window" or "frame" which is a boxed off portion of the monitor screen. In this embodiment, the window or frame containing the secondary information is fully or partially hidden by the window or frame in which the primary information is being displayed. In other words, the device stores the secondary information (or the hidden portion of it) in memory until the window in which it is to be displayed is called, activated, or otherwise brought to the front, at which time the hidden secondary information (or a greater portion of it) is automatically and almost instantaneously displayed. (The information also may be downloaded into a screen-saver format and displayed as such.)

Alternatively, and in a similar manner, the device treats the secondary information as being downloaded into a window or frame smaller than the information screen to be displayed—so that only a portion of the secondary information is displayed. (In some embodiments, the displayed portion of the secondary window or frame includes only its border and/or scroll bars). The device stores the secondary information (or hidden portion of it) in memory until the window or frame in which it is to be displayed is activated and automatically enlarged. (Activation and automatic enlargement need not consist of dragging the edge or corner of the window frame to enlarge it, but also consists of clicking on or otherwise activating a control which substantially and automatically enlarges the window or frame.) The automatically enlarged window or frame may fill a larger portion of the screen or all of the screen, causing the hidden secondary information (or a larger part of it) to be automatically and near-instantaneously displayed.

In another embodiment, the device also treats the secondary information as being downloaded into a window or frame that is not fully displayed, but upon activation the device displays the secondary information by transfer to the active (or another active) window or frame.

Many Internet websites incorporate software which counts every time a page is accessed. Each access is called a "hit." Many websites also count every time a particular hyper-link on a page is clicked to go to another website (called a "click-through"). Many websites deposit "cookies" in the memories of the computers which access the website. A "cookie" is a file which records and tracks "who" visits a site, "what" he or she clicks on and "how often." Many websites allow third parties to place advertisements (similar to display advertisements in a magazine, or commercial on television) on the website for a fee.

One purpose of counting and tracking website usage is to be able to charge advertisers by the number of times an advertisement is seen (number of hits) or the number of times an advertisement is clicked on to get more information from another web page or website (number of click-throughs). These methods do not accurately count the access to the secondary information displayed by the present invention. For example, a hit counter could count how many times some trailing secondary information is seen, but not which trailing secondary information is seen. A hit counter could count how many times a "keyhole image" embedded in the primary information is seen, but not how many times the keyhole is clicked on to access the secondary information. "Click through" counters that count when a user links to new pages would show nothing when a user links to a screen or body of secondary information (a "virtual page" of secondary information described more fully below) already downloaded onto the user's device.

Accordingly, this invention includes a method, device and/or an apparatus for counting which secondary information is seen, how many times and by whom. This information on counted "virtual hits" and "virtual click-throughs" may be deposited in cookies, equivalent "virtual cookies" or transmitted back to one or more servers during background processing during wait time. Implementation of such counters may be accomplished by obvious extensions of current technology as will be recognized by those skilled in the art.

An alternate embodiment of the invention does not always download the same secondary information. When a user contacts a remote source, the remote source can learn (by reading a cookie file from the user's device) whether, how recently, and/or how often the user has visited the remote source before, and what the user has accessed at the remote source. Based upon that knowledge, the remote source transmits certain secondary information to a first time visitor, different secondary information to a repeat visitor or frequent visitor, still other secondary information to a registered visitor, other secondary information to a subscribing (or paying) visitor, etc. In some embodiments, the remote source ensures that a particular user sees certain secondary information only a set number of times in any time period. (For example, a virtual page in the form of an advertisement might be transmitted to one user no more than twice a day and/or five times in a week, etc.) in some embodiments the remote source randomizes aspects of the secondary information it transmits, or transmits different secondary information depending on time of day, season of year, etc.

In some embodiments, several secondary virtual pages™ will be downloaded with the primary information, but subsequent user actions (or previous user actions as recorded in cookie-type files) will determine which secondary virtual page™ is displayed.

In some embodiments of the present invention, after secondary information has been downloaded from a remote source, as long as the device is not transmitting or downloading other data (e.g. the user is reading and/or listening to the display), the embodiment downloads additional secondary information from another pre-specified source (the "additional source"). (Even if a remote source has no secondary information to download, secondary information may be downloaded from another pre-specified source.) The additional source is pre-specified in a variety of ways: by the user, by the source file of the primary (or secondary or other) information, by the server or computer on which the primary (or secondary or other) information is located, by "browsing" software, by the network or its administrator (whether intranet, Local Area Network, or other network), by the provider of access to the network (e.g. an Internet Service Provider, a proprietary service such as America On Line® with or without Internet content, etc.), by some hierarchical combination, by some other contingency such as the particular or type of remote source of the primary information, etc. One website may transmit secondary information that will be displayed in conjunction with information from another website. In some embodiments, the particular secondary information downloaded from the additional source is contingent upon characteristics of the primary information downloaded, of its source, of the user, cookie-type files, etc. The same or different hierarchy determines the order in which the various secondary information is displayed.

As one example, the device downloads a primary virtual page™ and a trailing virtual page™ (referred to below as the "first trailer") from the one remote source. Then, while the user reads the primary virtual page™, the device, downloads a trailing virtual page™ from a second remote source (referred to below as the "second trailer"). When the user seeks access to a different quantum or body of primary information, during the wait time required for accessing, downloading and processing the new primary information, the device will display the first trailer and then the second trailer. In some embodiments the second trailer is displayed only if the new primary information is not yet downloaded and ready for display. In other embodiments, the second trailer may pre-empt the display of new primary information for a set time cycle (e.g. 5 seconds).

Even very long "files" not needed for immediate viewing or listening can be downloaded in the background by the device during machine wait times (e.g. while the user is reading text displayed on the screen or listening to audio playback of a previously downloaded audio file). The long file is segmented into small files each of which is named. After the first small file is downloaded, its address and file name is in the memory on the user's device, in a manner known by those skilled in the art. After each subsequent small file is downloaded, a new file name (and/or address) is deposited or the last file name (and/or address) is revised. In some cases the entire set of small files is not downloaded in one wait time. At the next wait time, the device automatically contacts the remote source. The remote source reads the file name (and/or address) which tells the remote source where to resume downloading.

In some embodiments, a particular piece of secondary information may be cached and displayed several times. The secondary information is accessed several times from (or displayed several times in conjunction with) one particular quantum of primary information. Alternatively, the secondary information is accessed from (or displayed in conjunction with) several different pages or quanta of primary information. In other words the same trailer might be downloaded once and displayed various times after various different primary pages or virtual pages™.

The virtual page™ that is next displayed may depend on how the user "leaves" the virtual page™ that the user is currently viewing or experiencing. For example, in current practice of Internet usage one can "leave" a webpage in a variety of ways. One can "leave" to seek new information by clicking a hyper-link on the webpage to access another webpage or by clicking on a "bookmark" (a previously stored address of a website). Alternately, one can "leave" a webpage to review pages previously seen in the log-on session by calling up a list of the session's "history" (a list of previously viewed pages) and activating one such page which may be accessed from cached memory or downloaded anew—or merely activating the "back" command, which displays the previous page seen. One can go back to the beginning of the log-on session by activating the "home" command. In addition, one can "leave" a webpage by quitting or exiting the browser, disconnecting from the Internet Service Provider, or otherwise logging off. A trailer of secondary information might show in all, none or some of these variations on how a user "leaves" a webpage. If a trailer is not shown for a particular method, such as activating "back" to show a previous webpage, the trailer may remain in the memory cache and be shown when the user "leaves" that previous webpage in a prescribed manner.

Another embodiment of the present invention filters secondary information in a variety of ways. The filter may prevent certain secondary information (or secondary information from certain sources) from being downloaded and/or cached and/or displayed. The filter may act to block access altogether, or may act selectively by filtering only part of the content of the secondary information. The filtering actions may vary depending on various factors including (but not limited to) time of day, number of times the secondary information has been previously downloaded, etc. The filter may be imposed to block unauthorized use of this invention by others, and/or may trigger counting or recording devices to count or transmit counts or other usage information on secondary information being (or attempting to be) downloaded such as when, by whom, how long, etc.

In some embodiments, the filter is pre-specified by the user. In other embodiments, the filter is specified by the source file of the primary (or secondary or other) information, by the server or computer on which the primary (or secondary or other) information is located, by "browsing" software, by the network or its administrator (whether intranet, Local Area Network, or other network), by the provider of access to the network (e.g. an Internet Service Provider, a proprietary service such as America On Line® with or without Internet content, etc.), by some hierarchical combination, by some other contingency such as the particular or type of remote source of the primary information, etc.

A filter may block access to particular secondary information and substitute other secondary information from a memory cache or from some other source, present or remote. Such substitution may be controlled by a variety of conditions or constraints such as those described above.

The apparatus may be embodied in other ways as well. The connections between devices may be via one or more of (but not limited to) the following: telephone wires, cable TV wires, wireless communications (including infrared devices, cellular, mobile phone and satellite communications) and other electronic networks including but not limited to the Internet.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the numeral 10 generally refers to a device for displaying primary and secondary information in accordance with the present invention. The device includes a base or body 14 and a video display 12 which includes a screen 16. The screen 16 may include a transparent interactive overlay to act as a touch screen, by which the user may use his or her finger or a stylus as a pointing device. A touch-pad pointer device 18 is also shown which may select items from the screen. An alphanumeric keyboard 20 is affixed to the base or body 14 of the apparatus for data entry of alphanumeric and other information. The video display 12 is hinged to the body 14. The video display 12 and body 14 swing together, so that the video display can act as a cover for the device 10. A slot 24 on the side of the apparatus allows the user to attach additional cards or cartridges (such as PCMCIA cards, which are not shown) to the apparatus which add functionalities, memory, programs, modems, etc. to the device 10. A communications port 26 (for example an infrared communications port) enables the apparatus 10 to exchange data wirelessly with other devices so equipped. A microphone 28 receives audio input. One or more speakers 22 provide audio output. A disk drive 30 allows data to be stored on disks or retrieved therefrom. The device may also contain additional internal storage such as a hard disk drive (not shown). Power is supplied by a rechargeable internal battery (not shown).

Figure 2:
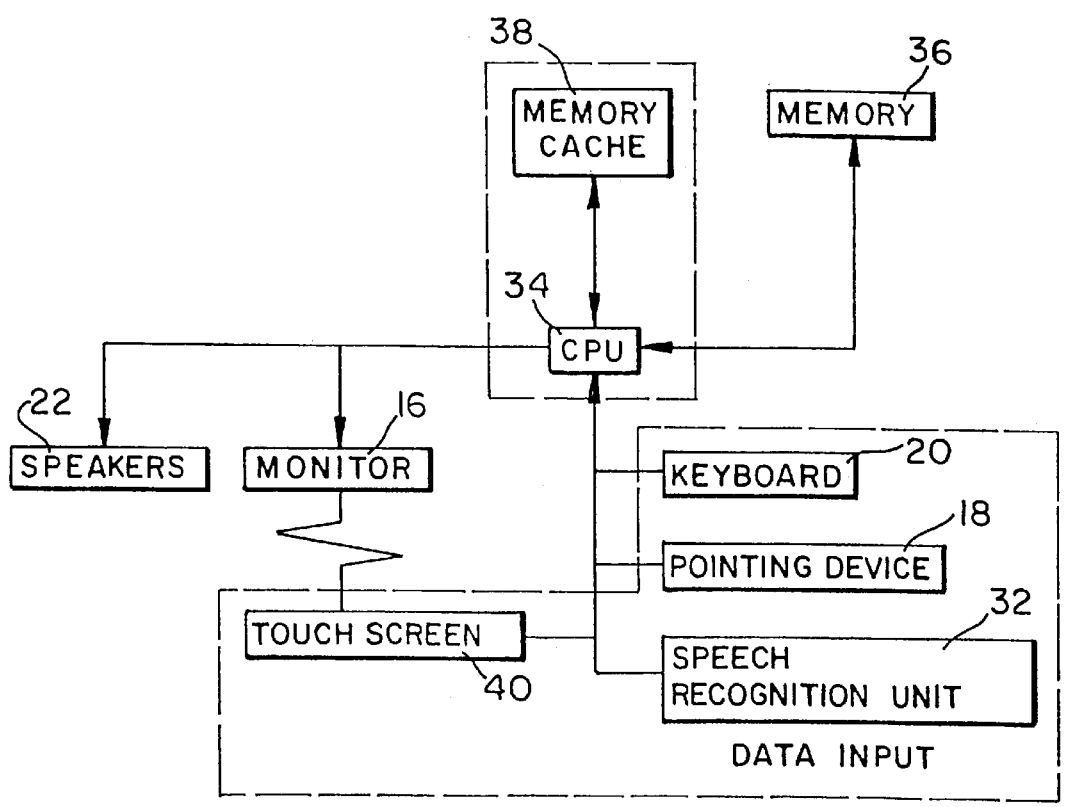
FIG. 2 is a schematic block diagram of the electronic apparatus of FIG. 1.

Referring to FIG. 2, a schematic block diagram of the apparatus 10 is illustrated. A programmable processor or CPU 34 is in communication with various kinds of memory 36 including in particular a fast memory cache 38. The CPU 34 is connected to various data input devices, such as the keyboard 20, a pointing device such as the touch-pad 18, a mouse, track ball, touch-pad or other digitizer, a speech recognition unit 32, and a touch screen 40. In addition, the CPU is connected to output devices including a monitor such as an interactive screen 16 and speakers 22.

Figure 3:
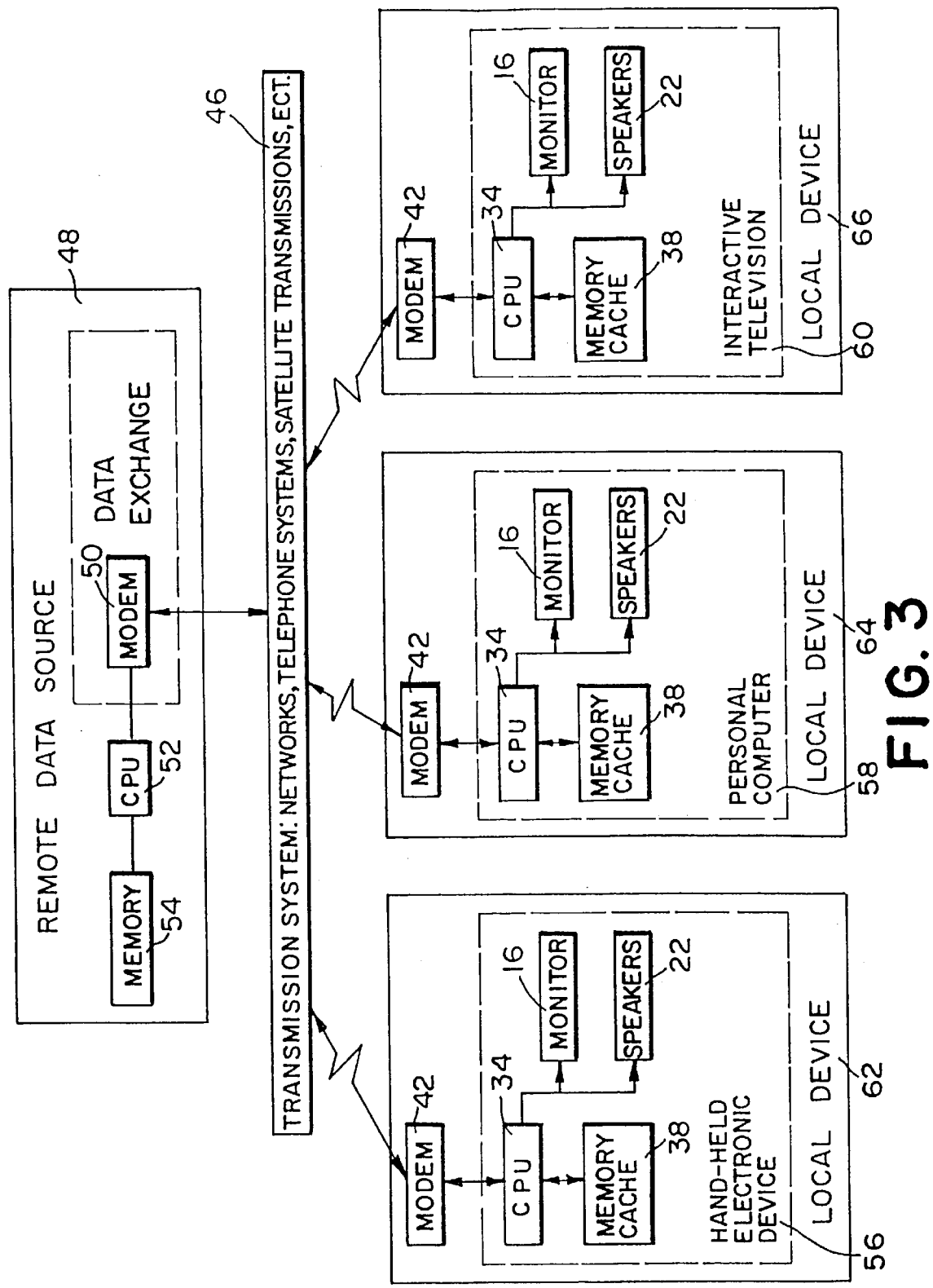
FIG. 3 is a schematic block diagram of an interconnected device for displaying primary and secondary information, in accordance with another embodiment of the present invention.

FIG. 3 illustrates a schematic block diagram of an alternative embodiment of the present invention in which an interconnected device which includes the apparatus in FIG. 1 as one of the local devices (e.g. 62, 64, or 66) connected to a remote data source 48 for the system. The remote data source 48 may act as either a mainframe with "dumb" input devices, or as a server with "smart" input devices in a client/server architecture. The remote data source 48 may contain its own processor or CPU 52 and various kinds of memory 54.

Primary and secondary information is displayed on local devices (62, 64 or 66). Each local device, whether a laptop computer or other hand-held electronic device 56, desktop or other personal computer 58, or interactive television 60, etc. includes or is attached to a modem 42 which digitizes and encodes the input requests for data (input components not shown in FIG. 3) for transmission to the remote data source 48. The request for data is transmitted to the remote data source 48 through a transmission system 46 which includes networks (such as the Internet), telephone systems (public and/or private), radio wave, microwave, and/or satellite transmission systems, infrared signals etc. At the remote data source 48, a modem 50 reconstitutes the request for data into an electronic form usable by the processor or CPU 52. The remote data source 48 may have one or more modems to perform the input and output operations. The remote data source 48 transmits information back to the local devices, first converting it for transmission via its modem 50, then transmitting the information over the transmission system 46 to the local devices (e.g. 62, 64, 66, etc.).

The modems 42 in the local devices (e.g. 62, 64, 66, etc.) each decode transmissions from the remote data source for local processing, storage and display. The local CPU's 34 process the information, displaying primary information via monitors 16 and speakers 22. Secondary information is stored in the memory caches 38, until requested by the user or the CPU 34 (e.g. when a request for new primary information is transmitted), at which time the secondary information is displayed via monitors 16 and speakers 22.

An Illustration of Primary and Secondary Information Display

The illustration is most easily understood in terms of an interactive device to which a user has frequent access, such as a desktop personal computer or dumb terminal connected to a network.

Each user is assigned a password or user identification number. The password or user identification number might be assigned by a system operator or administrator prior to a user's first use of the device. In an integrated computer system, a user might have the same password to access both the portions of the computer system which embody this invention, and other portions of the computer system which perform other tasks, such as word processing, or accounting. Alternatively, the device might assign a password to the user on his or her first use of the device or let the user pick his or her own password that the device then remembers. If the user's access to the interactive device is via software installed on his or her own computer, the password might be assigned or chosen as a part of the setup and installation procedure of the software. Alternatively, the device might be programmed to accept as a valid ID a user ID issued by a third party (e.g. a credit card number, PIN number or social security number, etc.). Rather than a password, the device might use other user identification procedures, such as retina scans, finger print scans, vocal identification, etc., with requisite hardware incorporated into the device. If the user's access to the interactive device is via software installed on his or her own desktop terminal or computer, "logging on" to the computer or computer system using that user identification number and password, may also automatically "log" the user on to the present invention. In such a case, the enabling software resides as a memory resident program (like many scheduler and organizer programs) which is loaded when the machine is first booted up, but remains "dormant", with minimal use of machine resources until the user calls upon the present invention ("logs on") such as by clicking an icon, pressing a special key or combination of keys, or issuing a special voice or other command.

If repeat users are unlikely (as in a high volume shopping mall) or the apparatus is a hand-held electronic device like a personal digital assistant or electronic organizer, "logging on" consists of pushing a Start button, or inserting currency, or a credit card. (Alternatively, a payment operation, including entering the user's PIN number, might occur after an item to be purchased had been selected and confirmed.)

Figure 7:
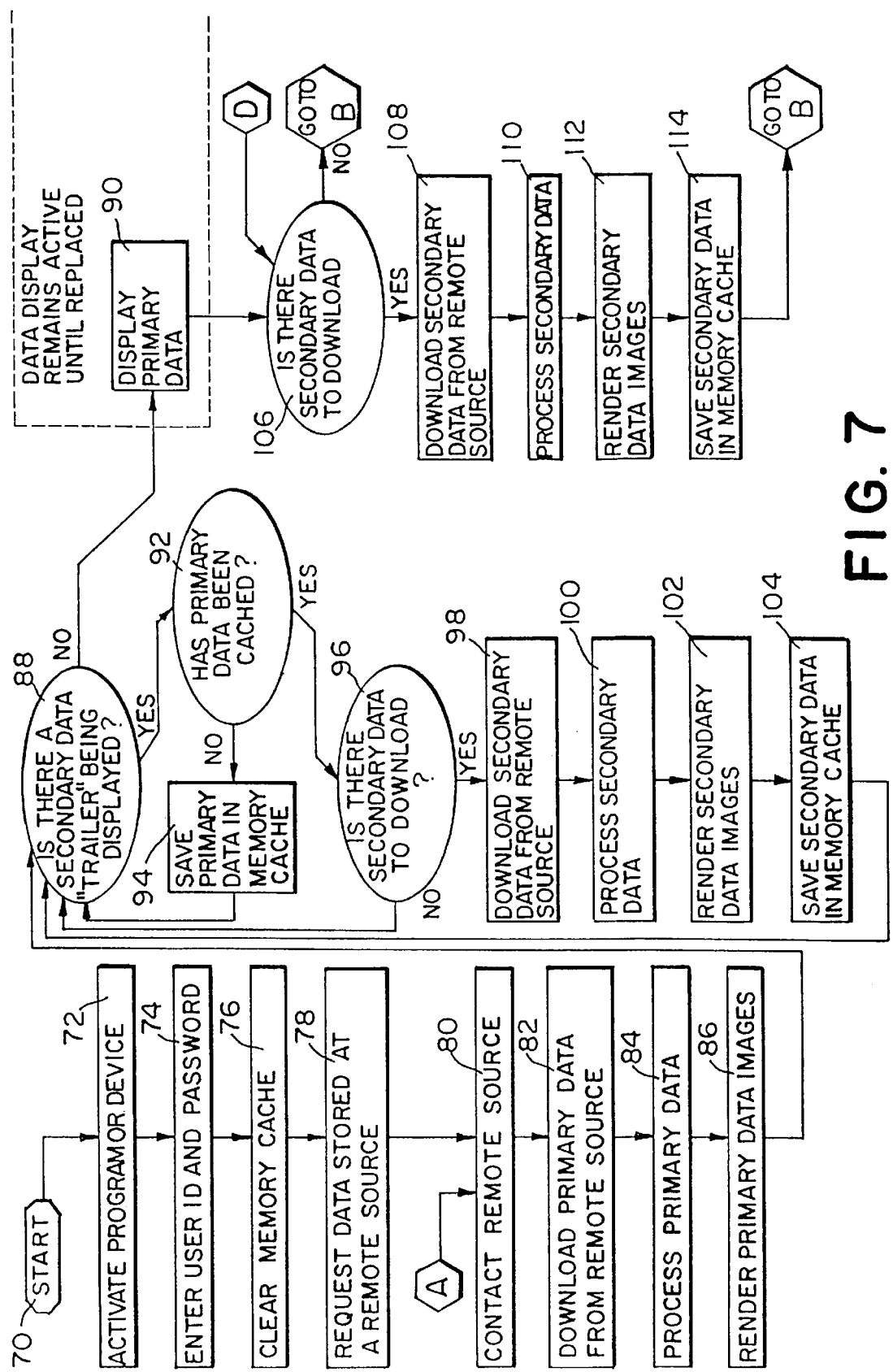
FIG. 7 is a flow diagram of a method used to access and download the primary and secondary information from a remote device, and then process, render and store the information locally in accordance with a device of FIG. 3, and then first display the primary information so downloaded.

In any event, referring now to FIG. 7, the user first "logs on" to the device (step 70), activating the program or device (step 72). The user then enters his or her password and/or user identification number (step 74). (In alternative embodiments, the device initiates and completes some other procedure to identify the user.) The device clears the memory cache used to store secondary information (step 76). Before the device can display any information, the user must request it (step 78). The device then contacts the remote source with the data (step 80), downloads the primary data from the remote source (step 82), processes the primary data (step 84) and renders images contained in the primary data (step 86). The device checks if it is currently displaying a trailing page from the last downloaded page (step 88). If not (which includes the first time in the log on session that data is requested), the device displays the primary data (step 90). If there is no secondary data to download (step 106), the device waits for further instructions (step 116).

FIG. 4 shows an example of primary data that might be displayed at step 90 to the user on the device's video screen or monitor 16. Portions of the primary data may be processed and displayed before other portions. For example, the text may be displayed before the image had been downloaded, processed and displayed. The user can read the text while display of the image is being completed.

If there had been secondary data to download (step 106), the device would automatically download the secondary data (step 108), process the secondary data (step 110), render secondary data images (step 112), save the secondary data and/or rendered images in memory cache (step 114) and then wait for further instructions (step 116), while the primary data is displayed to the user.

On the other hand, if, when the device checked for a trailing page (step 88), one was being displayed, the device checks whether the newly received primary data had been stored in memory cache (step 92). If not, the device saves the newly received primary data to memory cache (step 94), and queries whether the trailer is still being displayed (step 88). If so, it confirms that the primary data has been cached (step 92) and then checks for newly received secondary data (step 96). If none exists, it continues to check for the end of the trailer (step 88), at which time the stored newly received primary data is displayed (step 90).

In the embodiment described above, the device terminates the trailer after a preset time period, at which time the newly received primary data is automatically displayed (step 90). In another embodiment, the device permits the new primary data to override the trailer after a preset time period. In this latter case, the trailer continues to be displayed during this preset time period even if new primary data had been completely downloaded. In addition, if the accessing, downloading and processing time is longer than the preset time, the trailer continues to be displayed until the primary data is accessed, downloaded, processed, rendered and ready for display.

Figure 8:
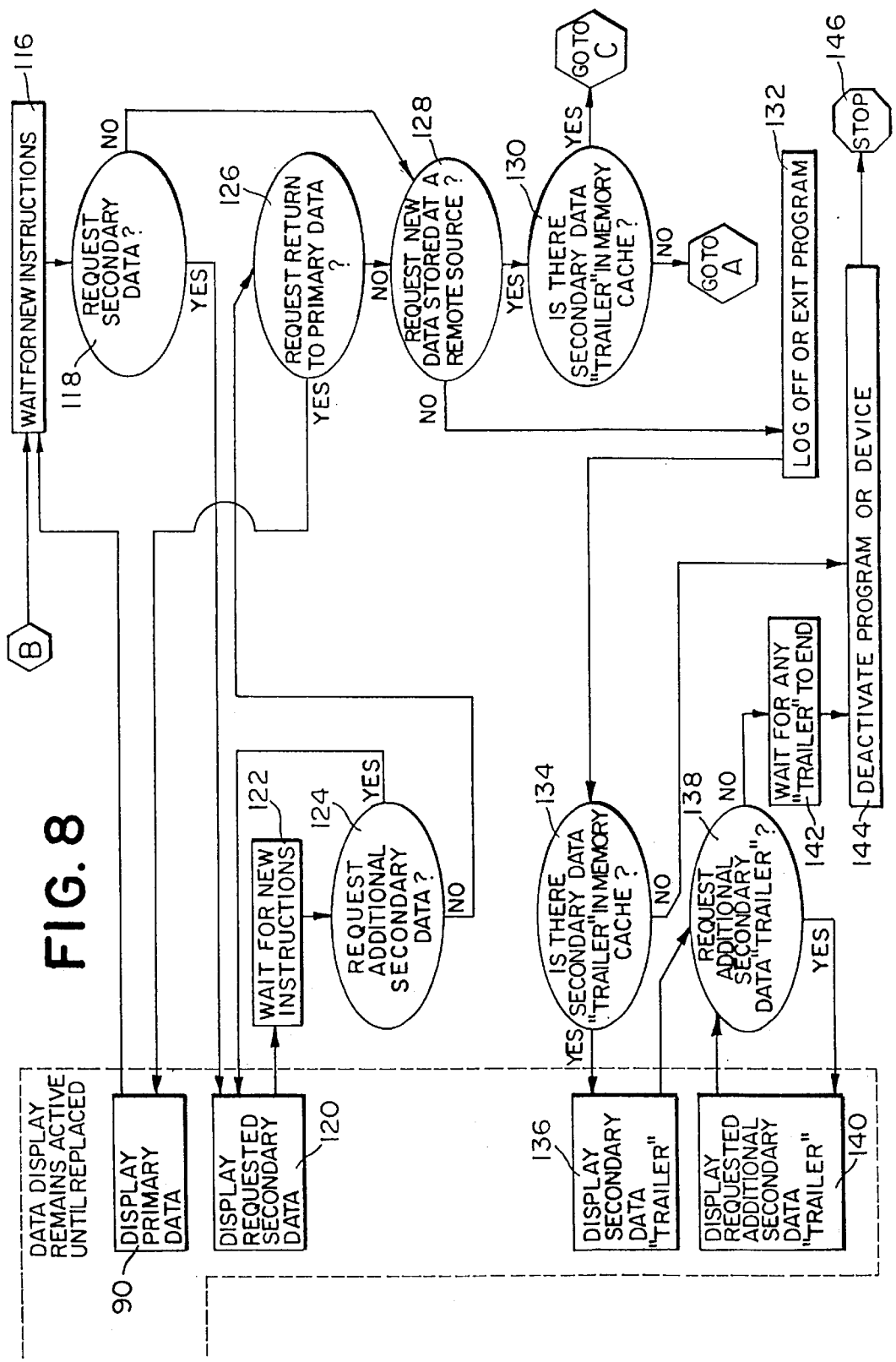
FIG. 8 is a continuation of FIG. 7, which shows a flow diagram of a method for displaying the primary and secondary information downloaded and stored via a method shown in the flow diagram of FIG. 7, in accordance with a device of FIG. 3.

Returning to the flow chart shown in FIG. 7, consider another branching at the check point of step 96. If the device found newly received secondary data to download (step 96), it would download the secondary data (step 98), process the secondary data (step 100), render secondary images (step 102) and save the secondary data and/or images in memory cache (step 104), while continually checking whether the device was ready to display the newly received primary data (step 88). The newly received primary data would be displayed (step 90) when the device was ready. After checking for further secondary data to download (step 106), the remainder of the secondary data is downloaded, processed, rendered, and stored (steps 108–114) while the new primary data is displayed. As shown in FIG. 8, the device then waits for further instructions (step 116).

Additional instructions for which the device waits (step 116) may include requesting the display of secondary data (step 118), requesting new data stored at a remote source (step 128) or logging off or otherwise exiting the program (step 132).

Consider again the primary data screen illustrated in FIG. 4. While the secondary data is downloaded, processed, rendered, and stored (steps 108–114), the primary data FIG. 4 will continue to be displayed (step 90). The user reads the text displayed on the screen in FIG. 4 while previously unprocessed secondary data is downloaded and processed in the background. Such downloading and processing does not effect screen display and is unnoticed by the user. This background downloading and processing (contemporaneous with foreground display of primary data) allows the device to make effective use of processing resources during what would otherwise be machine wait time.

When the user views the screen illustrated in FIG. 4 and wants to access the secondary information, he or she clicks on the image of a man's face (a "keyhole image" of a man's face) or the caption beneath the image: "Click here to see full page". Some embodiments show just the image, or just the caption, or require some other control (e.g. an icon or button) or command to be activated to request the secondary information.

Figure 5:
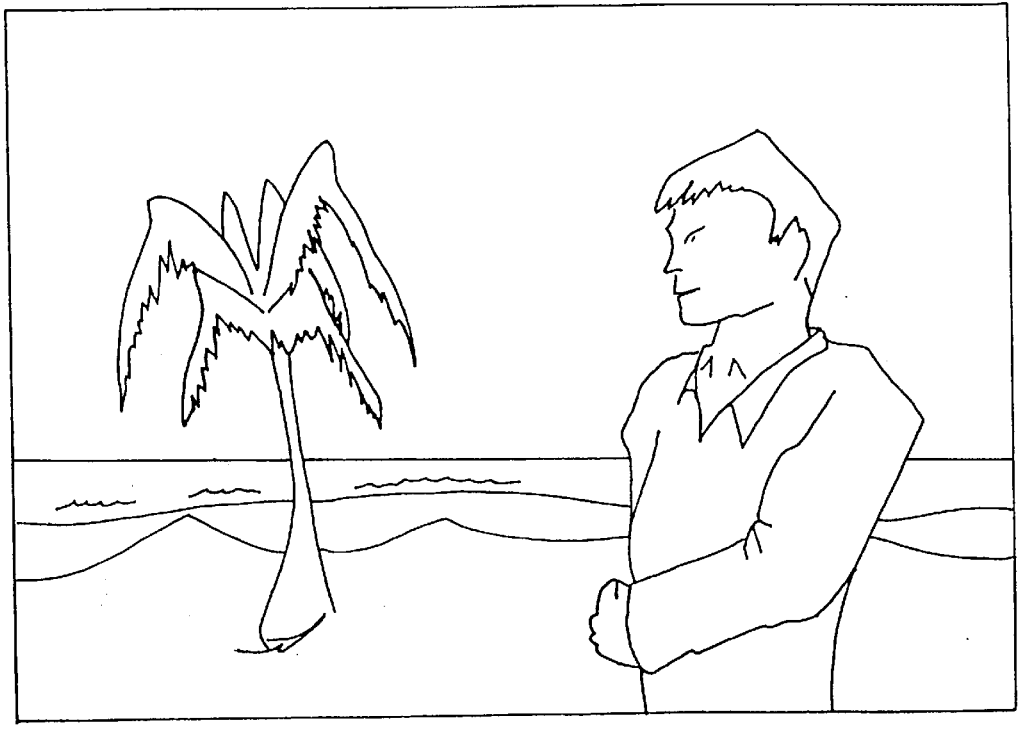
FIG. 5 is an illustration of a second representative screen of the device referred to in FIG. 4, displaying the secondary graphic information as it appears after the user has "clicked" on the "keyhole" image shown in FIG. 4 with a pointer device such as a mouse or touch-pad.

In any event, referring now to FIG. 8, when the user requests secondary information (either by explicit command or by activating a control) (step 118), the secondary information will be immediately recalled from the cache and displayed (step 120). An illustration of the secondary data is shown in FIG. 5. Notice that the "keyhole image" of the man's face remains the same in both FIG. 4 and FIG. 5 and remains in the same place on both screen displays.

In some embodiments the primary screen has two or more keyholes to the same secondary data. An example (not shown) would be if the screen illustrated in FIG. 4 contained not only a keyhole image of the man's face, but also a keyhole image of the palm tree (or a portion of it) that appears in FIG. 5, and clicking on either image displays FIG. 5.

In some embodiments, display of the secondary data is activated by two or more different types of links embedded in the primary data screen, including not only keyhole images, but hypertext links. An example (not shown) would be if the words "the dunes" in FIG. 4 were highlighted in a red (or a red colored font) and acted as a hypertext link to the screen in FIG. 5. Then while viewing the primary data illustrated in FIG. 4., clicking on either the keyhole image of the man's face or the words "the dunes," displays the screen illustrated in FIG. 5.

Importantly in some embodiments the primary screen has more than one keyhole, hypertext or other link, but not every keyhole, hypertext or other link activates display of the same secondary data. An example (not shown) would be if FIG. 4 also contained not only the keyhole image of a man's face, but in the lower left hand corner, a keyhole image of two shells, along with highlighting in red (or using a red colored font) of the word "shells." Then while viewing the primary data illustrated in FIG. 4, clicking on the keyhole image of the shells or the word "shells," displays a screen image (different from FIG. 5) of shells and debris on the beach. At the same time, clicking on the keyhole image of the man's face or the word "dunes" displays FIG. 5.

As discussed above, the secondary data need not be linked to the primary data via a "keyhole." In addition, the secondary data may itself contain additional "keyholes" or other forms of links to other secondary data or other primary data from remote sources (such links are not shown in FIG. 5).

The secondary information remains displayed while the device waits for new instructions (step 122). Additional commands include the user requesting additional secondary data (step 124) (e.g. via another "keyhole"), requesting a return to the primary data (step 126), requesting new data (step 128), or logging off (step 132). In some embodiments, the device itself automatically issues the next command, such as to return to the primary data after a set time (such as 5 seconds), or a display of additional secondary data after a set time.

If additional secondary data is requested (step 124), the additional secondary data is displayed (step 120) while the device again waits for further input (step 122). If a request to return to the primary data is issued (step 126), the primary data is displayed (step 90) and the device waits for new instructions (step 116). Otherwise the device checks to see if new data is requested (step 128). If new data is not requested (step 128), the user may log off (step 132).

If new data is not requested (step 128), but rather the user logs off (step 132), the device checks if there is a secondary data trailer in the memory cache (step 134). If so, the trailer is displayed (step 136). While the trailer is being displayed, the device checks for requests for additional secondary data trailers (step 138). If a request is made, the additional trailer is displayed (step 140). Otherwise, the device waits for all trailers to finish (which will automatically occur after a set time) (step 142). After all requests have been carried out and the trailers finished (step 138 and 142), the device deactivates the program, database or device (step 144) as requested in the log off or exit (step 132) and the flow chart is completed (step 146).

Figure 6:
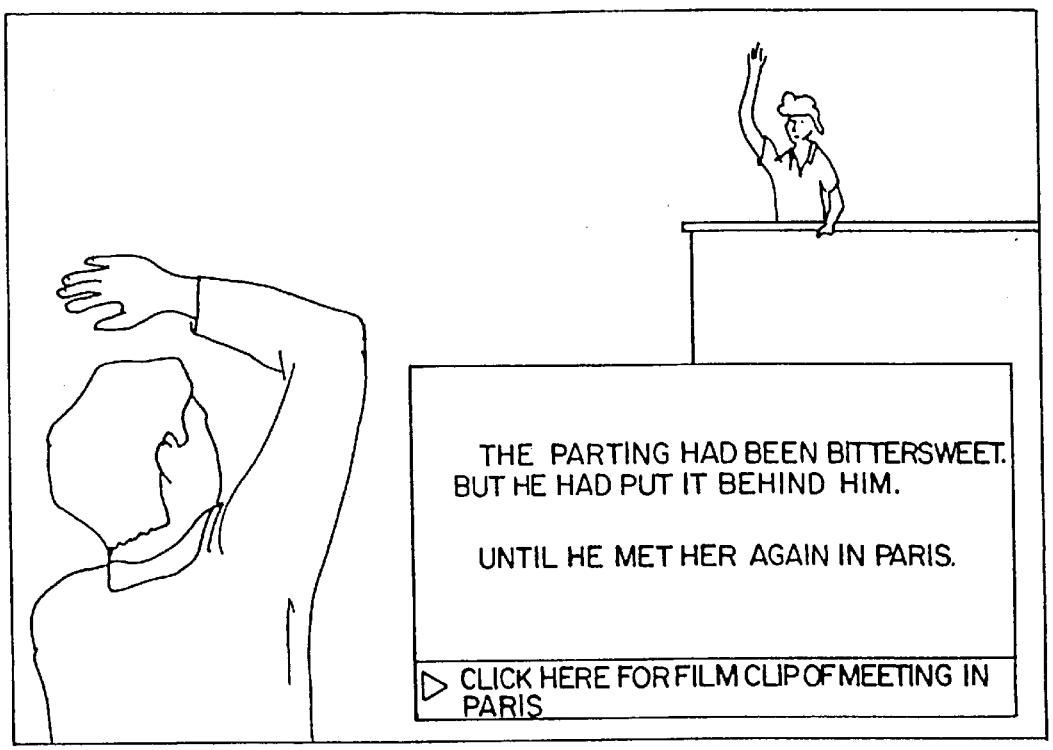
FIG. 6 is an illustration of a third representative screen of the device referred to in FIG. 4, displaying secondary graphic information in the form of a trailer or "trailing page"

An illustration of a secondary data trailer is shown in FIG. 6. The picture is intended to represent an animated video of two people waving at each other repeatedly as in a film loop. FIG. 6 demonstrates an example of a trailer that is linked to other secondary data. (A trailer need not be linked to other secondary data.) When the text box in FIG. 6 is activated (or the caption under it), an animated film clip is shown (within the boxed frame) of the couple's meeting in Paris (not shown in illustration). The user sees the video of the couple meeting at the same time as the user sees the couple waving at each other. This shows how secondary information need not fill up the whole screen, but rather only a portion of it. (Of course in an alternate embodiment, the video of the couple's meeting fills the entire screen.) Secondary information can share the screen with other secondary information or with primary information.

Returning to step 128 in the flow chart in FIG. 8, if new data is requested, the device checks if there is a secondary data trailer in the memory cache (step 130) before attempting to retrieve the new data. If there is no secondary data trailer in the memory cache (step 130), the device contacts the repository of the newly requested data (step 80), and proceeds to download, process, and render images contained in the data (steps 82, 84, 86). The device continues the process shown in FIG. 7, FIG. 8 and FIG. 9, until the user finally logs off (step 132) resulting in the deactivation of the device (step 144) and the completion of the flow chart (step 146) as described above. However, if, at step 130, the device detects a secondary data trailer in the memory cache, the trailer is displayed (step 147), before the new data is retrieved. (FIG. 6, discussed above, illustrates a secondary data trailer that might be displayed.)

While the device retrieves and processes new data the user must ordinarily wait. FIG. 9 illustrates how the present invention efficiently uses this user wait time to display a trailer (when one exists) while contemporaneously retrieving and processing new information. The two processes, displaying the trailer and getting new data occur at the same time: the trailer is displayed in the foreground while new data is retrieved and prepared in the background.

While secondary trailer data is being displayed in the foreground (step 147), the following occurs in the background: the device contacts the repository of the newly requested data (step 80), and proceeds to download the data (step 82), process the data (step 84) and render images contained in the data (step 86). The device continues to download, process, render and/or save data (steps 88, 92, 94, 96, 98, 100, 102 and 104), in the background as long as the device is displaying any secondary data trailer (steps 147 or 150) in the foreground. This general process is illustrated in FIG. 7 and described above, but is now shown in FIG. 9 to emphasize that it is occurring in the background while the device displays and processes secondary trailer data in the foreground.

While the data is being accessed, etc. (steps 80, 82, 84, 86, 88, 92, 94, 96, 98, 100, 102 and 104) in the background, the following occurs in the foreground: the device displays the secondary trailer data and monitors whether there is any request for additional secondary data trailers (step 148). (An example is discussed above with respect to FIG. 6 and a user request to see a film clip of Paris.) If a request is made, the additional trailer is displayed (step 150). Otherwise, the device waits for all trailers which are being displayed to finish (which will automatically occur after a set time) (step 152). After all requests have been carried out and the trailers are finished (steps 148 and 152), the device ascertains that no secondary data trailer is being displayed (step 88). The device then displays in step 90 the new body of primary data that had been accessed, downloaded, processed and cached in the background (steps 80, 82, 86, 88, 92, 94, 96, 98, 100, 102 and 104). The device continues with the process described above (step 106) and shown in the flow charts of FIG. 7, FIG. 8 and FIG. 9, until the user finally logs off (step 132), resulting in the deactivation of the device (step 144) and the completion of the flow chart (step 146) as described above.

Secondary Information

Secondary information or data is the information content which is displayed in an expanded or full screen format during the user wait time or delay period between a user's request for some action to occur with respect to primary information and the time in which the subsequently requested primary information is available for display. In the Internet environment, this time period is the wait time between web pages and is often referred to as "interstitial space." Secondary information may also be displayed on direct command from the user prior to this wait time.

As discussed above, a keyhole (or plural keyholes) or a thumbnail image of an entire or full image of secondary information may be created and displayed simultaneously with the primary information. Secondary information may also be made up of one small image (i.e., a small, partial screen file of image information) and one full size image (i.e., a full screen file of image information), wherein the two images are different from each other but related in subject matter. Banner and teaser advertisements (hereafter, "banner images") are examples of this type of secondary information wherein the small image is the banner image, and the full advertisement is a full size image related to the product or service shown in the banner image. Typically, the banner image is visually different than the full size image which is viewed if the user clicks on the banner image.

The secondary information may be information content which is not explicitly requested by a user, such as an advertisement or promotional material (e.g., banner ads on the Internet) or entertainment material. Alternatively, the secondary information may be information content explicitly requested by a user, but which the user desires to see only during user wait periods and in a preview mode while viewing primary information or upon direct request. This type of secondary information may be educational or training material, entertainment material, or the like. The secondary information may also be a combination of unrequested and requested material. The filter discussed above may be used to manage secondary information so that the user has partial but not full control over which secondary information is displayed.

Information Downloading and Storage

Figure 10A:
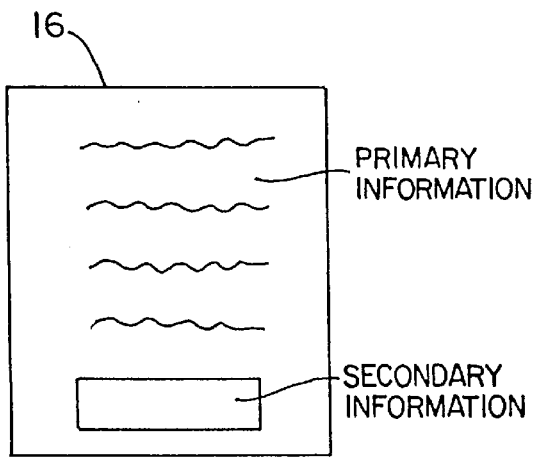
Figure 10B:
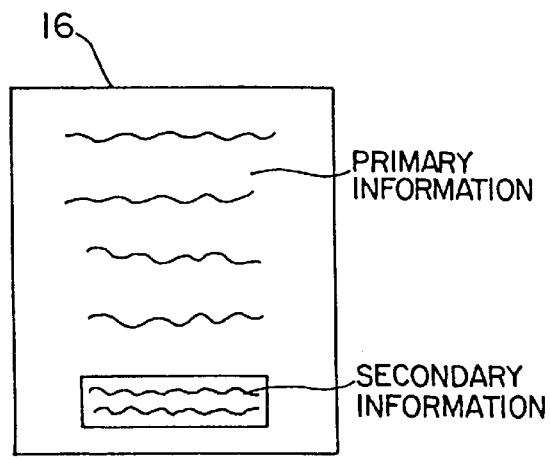

As discussed above, the secondary information may be retrieved (e.g., accessed and downloaded) after the primary information is retrieved. In this manner, the user is not inconvenienced in viewing the requested information by having to wait for the arrival of secondary information which was not necessarily requested. When displaying keyhole, thumbnail or banner images of secondary information, the display initially shows only the primary information, and subsequently adds the keyhole, thumbnail, or banner image, as shown in FIGS. 10A and 10B. FIG. 10A shows the display on the monitor 16 immediately after the primary information is retrieved, but during retrieval of the secondary information. FIG. 10B shows the display on the monitor 16 subsequent to retrieval of the secondary information.

When using the present invention in an Internet environment with web pages of text and images, the preferred web page creation technique is to call out the images and where they are located on the page. When the web page is transmitted, the text is sent first, along with data for generating a blank box for each image on the page. Next, the images are sent. At the display end, the text is immediately displayed, along with the blank boxes. After the text is transmitted, the image data is sent and replaces the blank boxes.

Consider an example of the present invention wherein the requested primary information consists of a web page of text and one image, and the secondary information consists of one image. In this example, the text is transmitted first, along with data to generate blank boxes for the primary and secondary information images. Next, the primary information image is transmitted and replaces the blank box held for the primary information image. Lastly, the secondary information image is transmitted and replaces the blank box held for the secondary information image.

In an alternative embodiment of the present invention, the secondary information may be transmitted simultaneously with the primary information so that both may be simultaneously displayed. This scheme will cause an additional delay in displaying the requested primary information. However, the delay may be minimal if the secondary information transmitted simultaneously with the primary information is limited to only the portion of the secondary information that is necessary to generate the thumbnail or keyhole image. The remainder of the secondary information (i.e., the portion that is necessary to create a full image) may be transmitted during the machine wait time or while the primary information is being viewed.

As discussed above, the secondary information is stored in a local buffer or cache memory. The primary information is also stored in a local buffer or cache memory. Hereafter, these storage elements are collectively referred to as "a storage device." The storage device is connected to a display controller, with in turn, is connected to a display. The display may include sound. The display controller performs the following functions:

1. Simultaneously displays the primary information, and a portion of the secondary information or a banner image related to the secondary information.
2. Displays the full secondary information in place of the primary information during the delay period which occurs upon request by the user of subsequent primary information or upon direct request by the user of the full secondary information.
3. (OPTIONAL) Replaces the full secondary information with at least the subsequently requested primary information upon receipt of the subsequently requested primary information. If no new secondary information is transmitted along with the subsequently requested primary information, and there is no previously downloaded but not yet viewed secondary information (or if the device is preprogrammed to prevent viewing of the not yet viewed secondary information), then the subsequently requested primary information is displayed without any portion of secondary information or banner image. If new secondary information or another banner image is transmitted along with the subsequently requested primary information, then a portion of that new secondary information or the banner image is displayed simultaneously with the subsequently requested primary information. Alternatively, the original portion of secondary information or original banner image is redisplayed simultaneously with the subsequently requested primary information, or a portion of new secondary information or a new banner image which was previously downloaded but not yet viewed, is displayed simultaneously with the subsequently requested primary information.

The replacement of the full secondary information with subsequently requested primary information may occur as soon as the subsequently requested primary information is ready to be displayed, regardless of whether the full secondary information was displayed or was displayed for a sufficient period of time for the user to absorb the information. Alternatively, the full secondary information may be held on the display for a predetermined period of time which is sufficient for the user to absorb the information, or until the user indicates in some manner that the full secondary information should be replaced with the subsequently received primary information. The subsequently received primary information would then appear immediately upon termination of viewing of the full secondary information.

To further explain the downloading and storage of secondary information, consider an image file which takes 40K of memory. If the secondary information comprises the 40K image file, then a thumbnail or keyhole image of that image file may only require about 4K of memory. The downloading or transmission scheme may occur in any of the following ways:

1. The primary information is downloaded along with a special 4K file that represents only the thumbnail, keyhole or banner image of the secondary information. The 4K file may be downloaded before, simultaneously with, or immediately after the primary information. If the 4K file is a thumbnail image, it may be prestored at the transmission site of the secondary information, or may be generated by a total image sampler located at the transmission site. If the 4K image is a keyhole image, it may be prestored at the transmission site of the secondary information, or may be generated by an image sectioner located at the transmission site. After the primary information and the 4K file of secondary information is downloaded, then a new 40K file representing the full secondary information is downloaded and cached for subsequent display during the next user wait period or upon direct request by the user. The new 40K file thus replaces the 4K file at the appropriate time. This replacement scheme should be used when the secondary information is a banner image and full advertisement image, since there might not be any redundancy of information between the two images, and thus the full advertisement image may not be partially or fully recreated from the banner image.

In this scheme, the storage device has a first storage area for storing data representing the primary information, a second storage area for storing data representing the entire secondary information (e.g., 40K image file), and a third storage area for storing data representing a portion of the secondary information (e.g., 4K image file). The display controller uses the data in the first and third storage area to cause the simultaneous display of primary information and a portion of the secondary information. The display controller uses the data in the second storage area for causing the full secondary information to be displayed in place of the primary information upon request by the user of the subsequent primary information or upon direct request by the user of the full secondary information.

2. The primary information is downloaded along with a 4K file that represents a portion of the 40K file which is used to create the thumbnail or keyhole image of the secondary information. The 4K file may be downloaded before, simultaneously with, or immediately after the primary information. After the primary information and the 4K file of secondary information is downloaded, then the remaining 36K of the 40K file of secondary information is downloaded, appended to the previously downloaded 4K file, and the entire 40K file is cached for subsequent display during the next user wait period. When the secondary information is a thumbnail image, the 4K file may generated at the originating site by interlacing the 40K image file (e.g., send every fourth line or portions thereof) or by using other image sampling techniques to create a viewable image from the original 40K image file. This technique reduces the downloading time for the entire secondary image compared to the replacement technique, since the previously downloaded 4K portion of the original image file is reused to create the entire image of secondary information. However, this technique requires additional image processing steps at the user's computer to reconstitute the entire image from the two parts (i.e., the 4K part and the 36K part).

In this scheme, the storage device has a first storage area for storing data representing the primary information, and a second storage area for storing data representing the full secondary information. The display controller uses the data in the first storage area and a portion of the data in the second storage area to cause the simultaneous display of primary information and a portion of the secondary information. The display controller uses all of the data in the second storage area to cause the full secondary information to be displayed in place of the primary information upon request by the user of the subsequent primary information or upon direct request by the user of the full secondary information.

3. When the secondary information is a thumbnail image, extrapolation techniques may be used to create the entire image. In this scheme, the primary information is downloaded along with a special 4K file that represents the thumbnail image of the secondary information. The 4K file may be downloaded before, simultaneously with, or immediately after the primary information. No further downloading occurs at this time. The 4K file is then processed locally by an image extrapolator using conventional extrapolation software to create the entire 40K file from the pixel data of the 4K file. The 40K file is then cached for subsequent display during the next user wait period or upon direct request by the user. The 40K file replaces the 4K file at the appropriate time. This technique substantially reduces downloading time for the secondary information, but will result in lower resolution full images of secondary information.

4. When the secondary information is a thumbnail image, sampling techniques may be used to create the portion of secondary information from the entire secondary image. In this scheme, the primary information is downloaded along with the entire 40K file that represents the secondary information. The 40K file is preferably downloaded after the primary information, but it could be downloaded before or simultaneously with the primary information. No further downloading occurs at this time. The 40K file is then processed locally by a total image sampler using conventional image sampling software to create the 4K portion of secondary information. The 4K file is then used for display of the portion of secondary information which is initially simultaneously displayed with the primary information. Similarly, for a keyhole image, the entire image could be downloaded at one time with the image sectioning occurring locally, and the 4K section being displayed simultaneously with the primary information.

User Request of Full Secondary Information

In one embodiment of the present invention, the full image of secondary information (i.e., the entire image pre- viewed in either keyhole or thumbnail mode, or the full size image associated with the banner image) is automatically displayed upon request by the user of subsequent primary information. Of course, the original primary information and the keyhole, thumbnail or banner image of secondary information has been viewed by the user before the request for subsequent primary information is made. Examples of requests for subsequent primary information include the following, all of which are within the scope of the present invention:

1. Retrieval of data from a local or remote storage device. The retrieval of data may take a significant amount of time, and additional time may be required if the retrieved data must be further subjected to image or sound processing.
2. Rendering of a CAD drawing. In this embodiment, the original or initial primary information may be a user input screen for preparing the drawing, or it may be an initial drawing that must be modified in a manner requested by the user.
3. Request for a new web page, either directly via a command line or via a hypertext link.
4. Search engine request made on the Internet or an intranet.

In another embodiment of the present invention, the full image of secondary information may be directly requested by the user by pressing or clicking a control or button. In this embodiment, no request for subsequent primary information is necessary to see the full image of secondary information. Of course, if the user requests subsequent primary information, the full image of secondary information may be displayed (or redisplayed) in the same manner as the other embodiment of the invention. In both of these embodiments of the present invention, the full image of secondary information is immediately retrieved from cache and displayed almost instantaneously since any downloading, retrieval, processing or rendering (e.g., graphics processing, data crunching or the like) already occurred in the background while the user was viewing the primary information.

Figure 11:
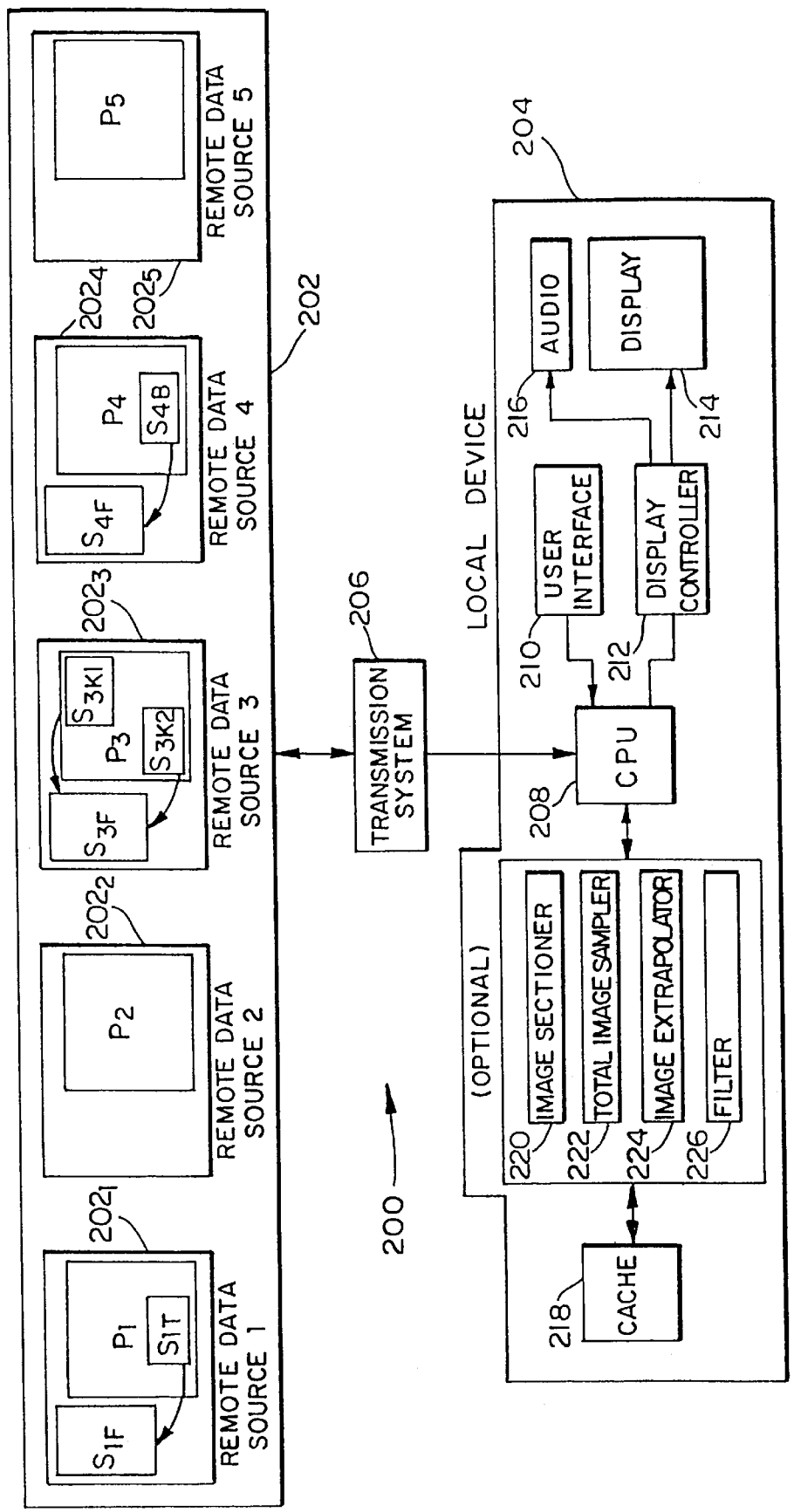
FIG. 11 is a schematic block diagram of an interconnected device for displaying primary and secondary information, in accordance with yet another embodiment of the present invention.

FIG. 11 shows a sample system 200 for implementing the present invention, particularly with respect to an Internet embodiment. The system 200 includes a plurality of remote data sources 202, a local device 204 and a transmission system 206 for communicating therebetween. Each of the remote data sources 202 and the local device 204 may be similar to the remote data source 48 and local devices 62–66 of FIG. 3, and thus may include additional elements not shown in FIG. 11, such as a modem. The transmission system 206 is similar to the transmission system 46 of FIG. 3.

FIG. 11 is described below in the context of an Internet application. However, the system 200 may be associated with an intranet, local area network (LAN), wide area network (WAN), or any system wherein data must be obtained from a location other than the local device 204, and where communication must occur between the local device 204 and the remote data source 202 to obtain the primary and secondary information. For example, the remote data source 48 may be one or more remote information memory devices, such as an optical disk storage device. A picture archiving and communication system (PACS) is one example of a system in which a local device (typically, a workstation) communicates with remotely located information memory devices (typically, archives of audiovisual or text and graphics information stored on optical disks). Likewise, the local cache or buffer in the local device 204 (described below), may be any local storage device associated with the local device 204 which ultimately receives the primary and secondary information communicated from the one or more remote data sources 202 or remote information memory devices.

The local device 204 includes a CPU 208, a user interface 210, a display controller 212, a display 214, an audio reproducing device 216, and a cache 218. The local device 204 may optionally include additional processing elements such as an image sectioner 220, a total image sampler 222, an image extractor 224 and a filter 226. The functions of these elements were discussed above, and thus are not repeated herein. Also, as discussed above, the optional image sectioner 220 and the total image sampler 222 may be located at the remote data source 202.

Figure 12:
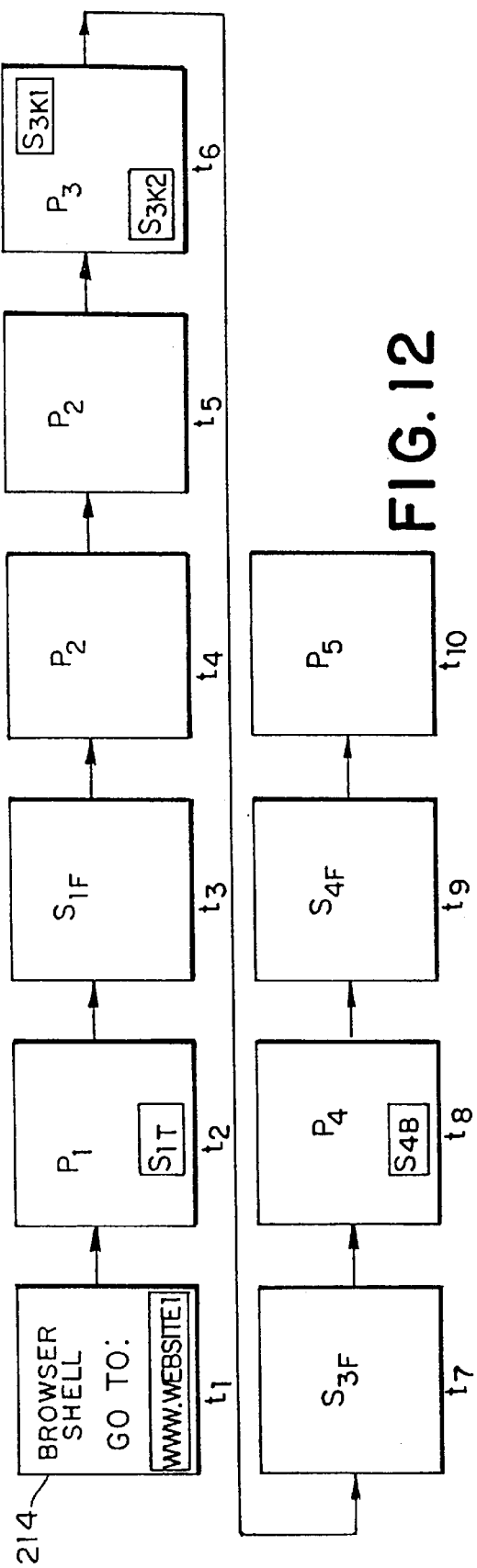
FIG. 12 shows sample screen displays which appear as a result of downloading of web pages from websites shown in FIG. 11.

FIG. 12 further shows the contents of the display 214 at a succession of time periods $t_1-t_{10}$ based upon a user's request and receipt of information from a succession of remote data sources $202_1-202_5$. Reference should be made to FIG. 11 in understanding FIG. 12. For illustration purposes only, the remote data sources $202_1-202_5$ are websites, the transmission system 206 is the Internet, and the user interface 210 is a web browser and user input device, such as a mouse or keyboard. In this example of the present invention, selected websites are preprogrammed to insert secondary information (S) into a requested web page of primary information (P). Web site $202_1$ delivers secondary information $S_{1F}$ with primary information $P_1$, which initially causes a thumbnail image of $S_{1F}$, labeled as $S_{1T}$, to be displayed with primary information $P_1$. Website $202_2$ either does not subscribe to the service which inserts secondary information into web pages, or does not insert secondary information with the particularly requested web page, and thus only delivers primary information $P_2$. Web site $202_3$ delivers secondary information $S_{3F}$ with primary information $P_3$, which initially causes two keyhole images of $S_{3F}$, labeled as $S_{3K1}$ and $S_{3K2}$, to be displayed with primary information $P_3$. Web site $202_4$ delivers secondary information $S_{4F}$ with primary information $P_4$, which initially causes a banner image of $S_{4F}$, labeled as $S_{4B}$, to be displayed with $P_4$. Website $202_5$ does not subscribe to the service which inserts secondary information into web pages, or does not insert secondary information with the particularly requested web page, and thus only delivers primary information $P_5$.

Referring to FIG. 11 and the display 214 in FIG. 12, at time $t_1$, the user requests to go to website $202_1$. At time $t_2$, the web page $P_1$ and secondary information sufficient to display the thumbnail image $S_{1T}$ is received. Thus, the web page $P_1$ is displayed simultaneously with a thumbnail image of $S_{1T}$. (If downloading occurs as described above in FIGS. 10A and 10B, there will be an interim display (not shown) between times $t_1$ and $t_2$ wherein the display will show only $P_1$ and a blank, outlined area for $S_{1T}$. This illustration omits such interim displays which are expected to appear for only a short period of time compared to total viewing time.) At time $t_3$, the user requests a new web page $P_2$, and the image $S_{1T}$ expands to $S_{1F}$ until the newly requested web page $P_2$ is ready for display. At time $t_4$, the web page $P_2$ has been received and is ready for display, and image $S_{1F}$ is replaced by $P_2$. At time $t_5$, the user requests a new web page $P_3$. Since there is no secondary information associated with web page $P_2$, the display does not change, except to the extent that the browser indicates that a new web page is being accessed. At time $t_6$, the web page $P_3$ and secondary information sufficient to display two keyhole images of $S_{3F}$, namely, $S_{3K1}$ and $S_{3K2}$, is received. Thus, the web page $P_3$ is displayed simultaneously with the two keyhole images $S_{3K1}$ and $S_{3K2}$. At time $t_7$, the user requests a new web page $P_4$, and the images $S_{3K1}$ and $S_{3K2}$ are replaced by, or are filled out by, $S_{3F}$ until the newly requested web page $P_4$ is ready for display. At time $t_8$, the web page $P_4$ and secondary information sufficient to display banner image $S_{4B}$ is received and is ready for display, and image $S_{3F}$ is replaced by $P_4$ and $S_{4B}$. At time $t_9$, the user requests a new web page $P_5$, and the image $S_{4B}$ expands to $S_{4F}$ until the newly requested web page $P_5$ is ready for display. At time $t_{10}$, the web page $P_5$ has been received and is ready for display, and image $S_{4F}$ is replaced by $P_5$. Since there is no secondary information associated with web page $P_5$, the display would not immediately change upon request of a subsequent web page, except to the extent that the browser would indicate that a new web page is being accessed.

As discussed above, the full images of secondary information may be replaced by the newly received primary information (i.e., web page) either automatically, or in response to a user command. In the automatic mode, the full image of secondary information may be replaced immediately upon receipt of the new web page, or the full image of secondary information may linger on the display for a predetermined period of time before being replaced with the new web page.

Plural secondary information may be shown simultaneously with the primary information, followed by a sequential viewing of the full secondary information. For example, in FIG. 12, there may be two thumbnails $S_{1T}$ and $S_{2T}$ downloaded and shown at time $t_2$. At time $t_3$, $S_{1F}$ would appear first, followed by $S_{2F}$ (assuming sufficient time exists, or if the device is programmed to time out the full secondary information). Alternately, clicking on $S_{1T}$ or certain links may cause $S_{1F}$ to appear at time $t_3$, instead of $S_{2F}$. However, clicking on $S_{2T}$ or other links may cause $S_2F$ to appear at time $t_3$, instead of $S_{1F}$.

Web Browser Implementation Considerations

When the present invention is implemented in an Internet environment, special considerations are required to ensure that the hardware and software of the present invention does not interface with existing web browsers and web programming languages, such as JavaScript™ (hereafter, "JavaScript"). The web browser market is currently shared primarily by Microsoft's Internet Explorer™ (hereafter, "Internet Explorer") and Netscape browsers including Netscape Navigator® and Netscape Communicator™. For security considerations, these browsers and web programming languages used with these browsers do not permit information retrieved from a website to be automatically written to the user's hard disk. Instead, the information is written to cache memory in highly restricted formats that permit only the display of the information. This security provision prevents hidden programs from being unknowingly loaded into a user's computer. Such hidden programs could be used to obtain unauthorized data from the user's computer or could infect the user's computer with a virus. In effect, this security provision ensures that there is no "persistence" of downloaded data in the user's computer, except to the extent that the data may be recalled from the cache memory. A very limited "persistence" is offered by the use of "cookies": short, encrypted data deposited by specific websites and retrieved only by the depositing website. This security provision must be taken in account when implementing the present invention because the more complex uses of secondary information described herein requires a degree of "persistence."

The example of the present invention described in FIGS. 11 and 12 may be implemented using JavaScript without altering the functionality of current browsers. Since the secondary information is stored in the cache memory, it is not necessary to download any special programs or otherwise alter the operation of current browsers for this example. Furthermore, the feature which allows the display of secondary information to linger for a predetermined period of time (i.e., timing out of the secondary information), or which allows the display to linger or be frozen until the user requests the new primary information, may also be implemented with current browser software. More particularly, JavaScript code can cause a "HOLD" button to be displayed on the screen during the interstitial space which, when clicked, causes the secondary information to remain on the screen, suppressing (or overriding) any timers, until the "HOLD" button is clicked again.

The HOLD feature may be used to hold the display of information objects in U.S. Pat. No. 5,572,643 (Judson), and the scope of the present invention includes such an embodiment.

Other features of the present invention cannot be implemented using current web programming software running with current versions of Microsoft or Netscape browsers. For example, it is not possible to cause $S_{1T}$ to be redisplayed simultaneously with $P_2$ at time $t_4$ and to then expand again into $S_{1F}$ at time $t_5$ when the user requests the third web page $P_3$. Nor could the user cause a second thumbnail image $S_{2T}$ originally shown at time $t_2$, but which did not get to be displayed in full form as $S_{2F}$ before time $t_4$, to be displayed simultaneously with $P_2$ at time $t_4$ and to then expand into $S_{2F}$ at time $t_5$ when the user requests the third web page $P_3$. To do either of these functions would require "persistence" of the software code that detects the event of a user request for a new web page and causes the full secondary information to appear. These restrictions limit the use of the present invention in an Internet environment, particularly if only a small percentage of websites have agreements to send secondary information with their requested web pages.

Notwithstanding current restrictions, all of the enhanced features described in the present application may be implemented in a number of different ways. One option would be to select a browser which allows the user to assert more control over what is done with downloaded data and how the data interfaces with other parts of the user's computer, such as ActiveX controls available for Microsoft's Internet Explorer. "Options" or "preferences" selected via the toolbar could be chosen to enable or disable functions that provide the additional control. Another option is to use a programming language other than JavaScript which allows for "persistence" or hidden programs to execute during web browsing. Some of the "push" narrow-casting software such as POINTCAST® (hereafter, "Pointcast") or the "push" channels incorporated into the latest 4.0 versions of browsers from Netscape and Microsoft exhibit "persistence" and caching but do not currently display during interstitial space. Yet another option is to use a plug-in or another layer of software which can interact with (i.e., capture events from, and send commands to) a current browser and operating system and which would allow for the necessary "persistence" to obtain the enhanced functionality.

Referring again to FIG. 11, in the most efficient Internet implementation of the present invention, the remote data sources $202_1$–$202_5$ do not actually store the thumbnail, keyhole or banner images, or the full images obtained therefrom. Instead, each remote data source appends HTML call commands to its respective web page $P_1$–$P_5$ to obtain the necessary secondary images from another website or web address. This scheme is explained in more detail below, and shown schematically in FIG. 18.

Cache Implementations

Figure 13:
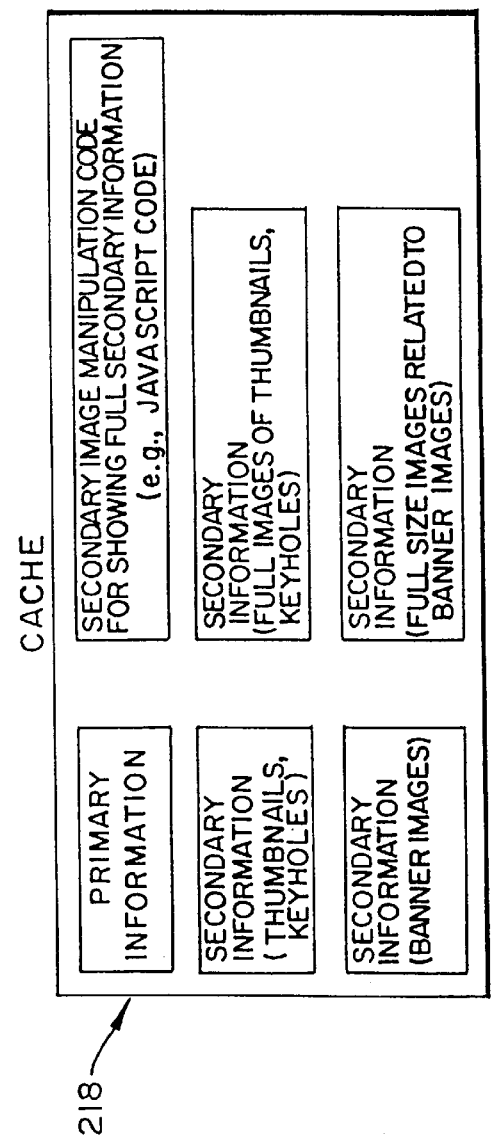
FIG. 13 is a schematic representation of information storage schemes for the cache used in any of the embodiments of the present invention.

FIG. 13 shows a schematic representation of the contents of cache 218 used in any of the embodiments of the present invention. The information stored in the cache 218 will depend upon the type of secondary information being manipulated, and whether a plug-in or downloaded code is used to generate and control the display of the secondary information. For example, the cache 218 would not include separate secondary information of the full image of a thumbnail image if the browser or image manipulation code creates the full image from the thumbnail image. Nor would secondary image manipulation code be stored in the cache if a plug-in is used.

Interactive Secondary Information

The scope of the present invention includes static, as well as dynamic, secondary information. Furthermore, the scope of the present invention also includes interactive secondary information (i.e., screens of information which the user may interact with in any manner). Interactivity may include, but is not limited to, inputting selections, text, data or game commands, or manipulating graphics.

Figure 14:
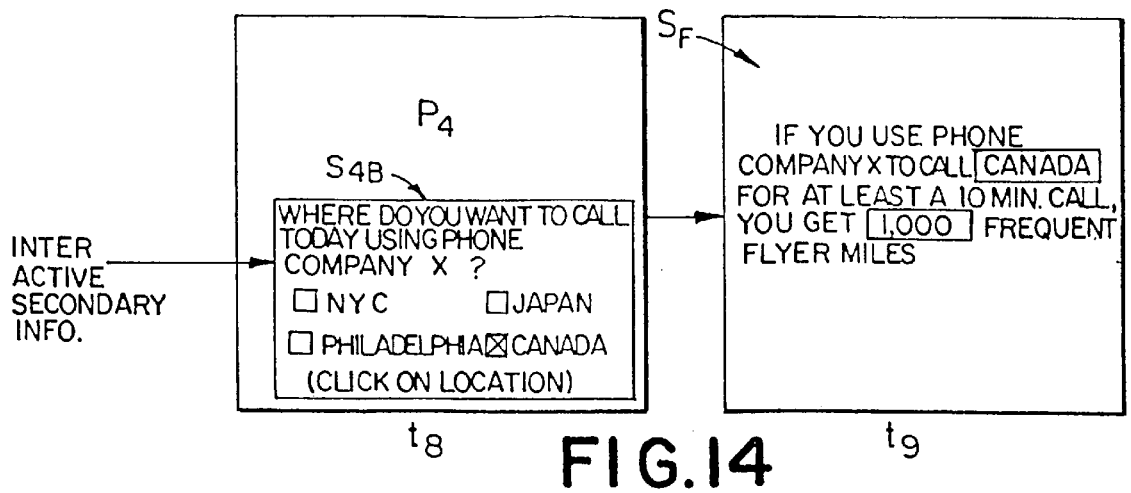
FIG. 14 shows sample screen displays which appear as a result of using interactive secondary information.

FIG. 14 shows an example of interactive secondary information. FIG. 14 is best understood with respect to the screen displays of FIG. 12 at times $t_8$ and $t_9$. At time $t_8$, FIG. 14 shows an interactive banner image $S_{4B}$ in the form of a teaser advertisement for phone company X. If the user clicks on a location, the full secondary information $S_F$ shown at time $t_9$ incorporates the user selection into its display. In this example, the selected location is inserted into the full screen advertisement and an award of frequent flyer miles is calculated and displayed for the selected location. The secondary information may have links to other websites which the user may click on.

Interactivity may also occur by using secondary information that is downloaded from a remote source along with primary information, manipulated during either the simultaneous or full display, and then saved in its new form. Consider, for example, the OLE automation capabilities of Microsoft Word which allows a user to embed OLE objects into a document. OLE allows the user to incorporate items produced by other programs (so-called "OLE-servers") into a document of an "OLE-client" application. For example, a picture produced by a graphics editor and which is stored in a file in a separate location may be inserted into text of a WORD document. The WORD document will automatically retrieve the picture and place it in the document. If the user clicks on the picture while using the document within a word processor, the graphics program will activate and allow the user to modify the picture. The modified picture may then be stored in the original file. A similar type of process may be used to modify a spreadsheet which is retrieved from a remote source and which is embedded within a page of an annual report downloaded from the web, Intranet, or company LAN.

The scope of the present invention includes embodiments which take advantage of such capabilities. Examples include the following:

1. The secondary information which is shown simultaneously with the primary information is a bit-mapped image which offers the user a preview of what is available when expanded. When expanded by the user or expanded automatically during the interstitial space, the user may interact with the full secondary information. The full secondary information is manipulable by a fully executable program, such as a game, graphics program, word processor, e-mail program, or the like.

2. The secondary information which is shown simultaneously with the primary information and the expanded full secondary information are manipulable by fully executable programs.

Filtering of Secondary Information

Methods of transmitting and displaying secondary information as well as devices and apparatus which implement such methods have been described above. Secondary information may also be filtered and prevented from being displayed, either entirely or selectively.

Several methods of transmitting and displaying secondary information have been described. One such method involves transmitting code for displaying the secondary information along with or contemporaneous to the primary information (e.g. using JavaScript code for displaying secondary information in an Internet browser such as Netscape Navigator®). Another method involves installing the code which displays the secondary information more permanently into the display device (e.g. a plug-in to an Internet browser, or a program which resides between the browser and the operating system). Such "permanent" code may be voluntarily installed by the user, or may be installed automatically (and perhaps unbeknownst to the user) when another program (such as a browser or office suite) is installed.

The embodiment of the filtering method is most easily understood in terms of software added to a device such as a personal computer. The software would act as a memory resident program such as an organizer, virus checker, or site filter (e.g. Net Nanny™ or other software which prevents an Internet browser from accessing certain websites).

Figure 15:
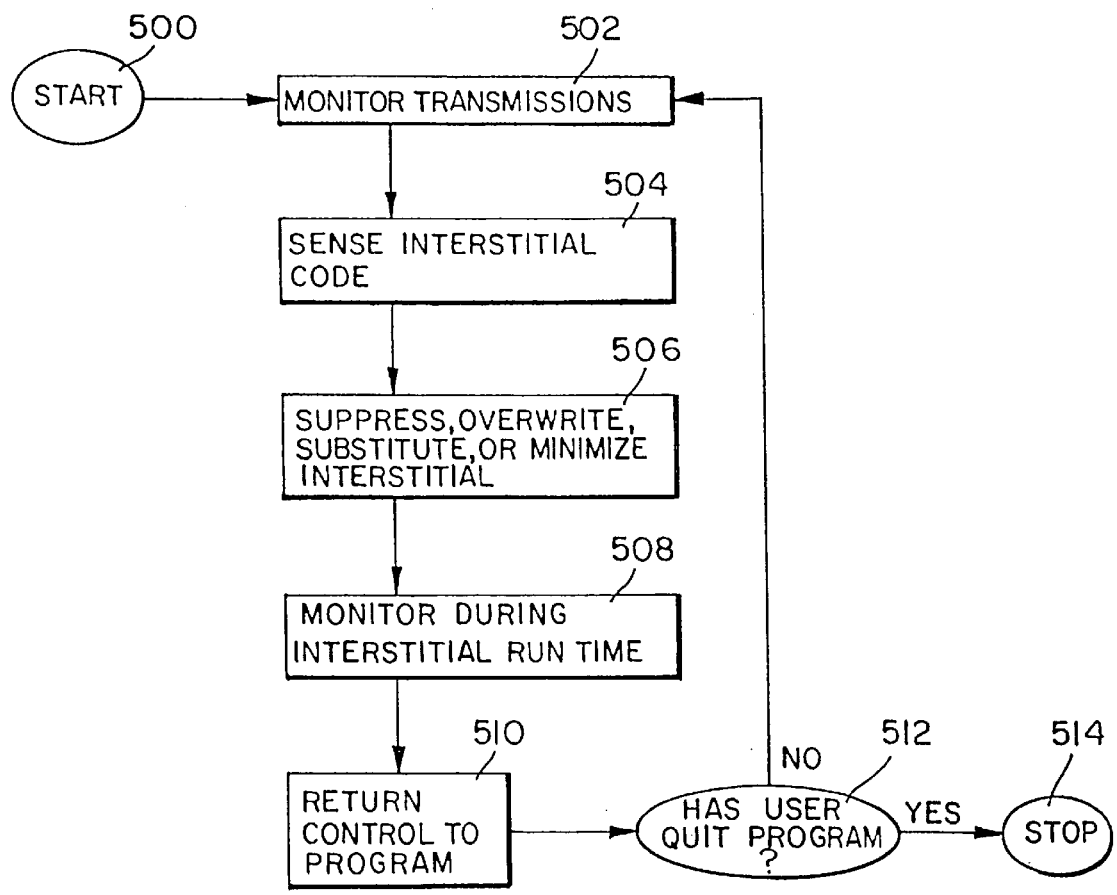
FIG. 15 shows a method of filtering secondary information.

Consider FIG. 15. When the browsing software (or other software for displaying the primary and secondary information) was launched, the filtering software would also be launched (step 500), but would remain quiescent in the background waiting to be triggered.

Consider first the case where the code for displaying secondary information is transmitted along with or contemporary to the primary information and no plug-ins are needed to execute the code. This code must be in one of the several limited varieties understood by the particular browser.

The filtering software would monitor transmissions (step 502) for evidence that secondary information was being transmitted, in ways known to those knowledgeable in the art. The evidence could include transmissions from or to particular web sites, transmissions containing particular code (which may be specific to the particular method of displaying secondary information, specific to the vendor or distributor of that method or may be more generic to many methods of displaying secondary information, such as required function calls in the languages recognized by the browser), and transmissions containing patterns of particular code or function calls. Examples of the current methods of obtaining similar evidence in related situations include virus scanning software which monitors transmissions for particular code of known viruses, monitors transmissions for patterns of code or function calls likely to be used by a virus, monitors transmissions for storage or alteration of data or code on the computer in places likely to be accessed, although the type of code and patterns of code, etc. used by viruses would be different than those used for displaying secondary information. Other examples include software installed on a home computer to prevent children from accessing pornographic Internet web sites, which prevent transmissions to or from known pornographic sites, transmission to or from sites that have names containing words making them likely pornographic sites, transmissions of web pages that have indecent language in the header (e.g. title or meta-tags) or body, or transmissions of web pages that contain language likely to occur on a pornographic site (the software may count the number of times certain words are used, the percent of such words in the text, the proximity of certain words or groupings of words, or the methods of inferring content from word recognition, pattern recognition or even image recognition, although the particular websites, words, patterns or code would be different for a pornographic sites than for code to display secondary information. Other filtering programs currently include those for sensing whether incoming electronic mail (e-mail) is "legitimate" or just electronic junk mail (commonly known as spam), which filtering programs similarly examine the source of the mail, and or words or phrases in the mail or attached documents.

Consider now the case where the code for displaying secondary information (or a portion of the code) has been installed in the user's computer, either as a plug-in or bundled and installed with other software, or run from a floppy diskette or CD-ROM from the user's computer by itself or as part of another program. The filtering software, as part of the start-up procedure (step 500) would search the user's computer, hard drive, accessories and peripherals for evidence of the program for displaying secondary information. The filter 226 would then continue to monitor transmissions (step 502), triggering events (not shown in the flow chart) and interstitial times (step 508) (discussed below) for secondary information and attempts to display the secondary information.

Filters for either case (code installed in the computer, or code transmitted like an applet with the information) or combinations of both cases would then intercept, block and/or modify the secondary information and its display as described below.

When the secondary information filter 226 senses and identifies an "undesirable" (from its programmed point of view) transmission or body of information (step 504), the filter 226 will then do one or more of the following: block receipt or sending of the identified transmission or data, substitute in the transmission or data corrective code, erase the identified information or data, or overwrite the identified data or code with corrective code (step 506). All of the above being used to prevent the display of secondary information or substituting user preferred secondary information (i.e., instead of an interstitial advertisement, the filter 226 will substitute a picture of the user's wife and children).

The filter 226 may not only monitor, block and alter transmissions to and from the device (as in transmissions from or to a personal computer from Internet web sites), but also "transmissions" within the device. In other words, the filter 226 may monitor the browser or device for certain events and/or function calls by which a program makes request of the device's operating system. (Alternatively, the filter 226 may monitor the device for or certain patterns of events or function calls.) The filter 226 may then prevent, suppress, or alter these transmissions to the operating system. In particular, the filter 226 may alter the transmission by sending instructions to the operating system to "minimize" the program or window which displays the secondary information during the time period of the secondary information display. The term "minimize" is used to indicate that the program remains loaded and runs, but is not displayed except as a small button or icon which indicates that the program is active and running. For example, the Windows operating systems has a status bar at the bottom of the screen which displays buttons with the name and icon of all loaded active and running programs, even those not currently generating a display for the screen.

The filter 226 may also operate by suppressing all graphics recognized by the browser or program for displaying the secondary information, during the run time of that secondary information.

The filter 226 may also monitor interstitial time periods (step 508) (the time after new data or processing is requested, until such data and/or processing has been completed and displayed) for secondary information. The filter 226 may institute this monitoring in all cases, or only if evidence of secondary information has been identified. If the secondary information has "escaped" detection or suppression, this offers another chance for the filter to do so. In addition to the other methods of preventing display of secondary information, the filter may in this case cause the screen to appear blank, or overwrite the screen display rather than other code.

The filter 226 will continue to monitor the device during the interstitial run time to prevent display of additional unwanted secondary information. When the interstitial time is over, and the next primary information is ready do be displayed, the filter 226 will allow that to be displayed, returning control of the screen and operating system to the program displaying the primary information (step 510).

The filter 226 will then test whether the user has quit the program that was retrieving and displaying primary information (step 512). If the user has quit the program, the filter 226 will stop (step 514). Otherwise, the filter 226 will continue to monitor transmissions (step 502).

The filter 226 may block all secondary information, or may selectively block secondary information depending on content, source, display method, etc. Selective blocking may be preset and precoded. Alternatively, the user may be given options of what he or she wants to block (similar in user interface to the choices that some Internet content filters give users). For example, one filter might block only adult oriented or pornographic interstitial advertisements. Another filter might block all secondary information except that issued using a particular company's software or transmitted by a particular company's server. Another filter might permit secondary information but cut off all interstitial advertisements after 5 seconds. These are just examples of some of the partial blocking possible and not intended to fully enumerate all embodiments of the filtering method described above.

Since the filter 226 is capable of blocking or altering secondary information which appears during interstitial space, the filter 226 may be used to block the display of information objects in U.S. Pat. No. 5,572,643 (Judson), and the scope of the present invention includes such an embodiment.

Program Code Considerations for Internet Implementations

One preferred method of implementing the present invention is in an Internet environment. As background to this implementation, HTML web pages typically include one or more highlighted hypertext links which allow the user to go directly to another website by merely clicking on a link. A link tag has the following general format:

```
<A HREF="website address">
text or image tag
</A>        (end of link tag)
```

If the link tag includes text, it is displayed in a highlighted manner to distinguish it from surrounding text and to indicate that it is a link. The text may be the website address specified by the HREF command, or some English language name or phrase to communicate to the user what the link is for (e.g., "Products of Company X,", "Employment Opportunities," or "Click Here"). If the link tag includes an image tag (e.g., a bit-mapped image of text or a graphical image), the image is obtained from the designated website address specified in the image tag, as discussed in the next paragraph.

HTML web pages also have image tags to specify where images are located in the worldwide web which are to be displayed on a requested web page. A simple image tag is as follows:

```
<IMG SRC="website address of image">
</IMG>      (end of image tag)
```

To view the image, the browser must go to the specified web site and retrieve the image. As discussed above, if a web page includes a combination of text and images, the text is typically downloaded first, and a blank area is left for the image which is downloaded after the text. An image tag for such a web page usually has additional information about the image and information to tell the browser where to put the image on the screen, as follows:

```
<IMG SRC="website address of image" HEIGHT=X WIDTH=Y>
</IMG>      (end of image tag)
```

In the tag image above, X and Y are numbers of pixels. Browsers use this information to properly place the image on the display screen. Browsers also automatically size images to fit into specified locations on the web page if the image tag sizing or location data is incomplete or incorrect. Thus, browsers automatically extrapolate images, or compress or reduce images, if necessary. After an image file is downloaded, it is cached. The image tag may also give a name to the image for referring to the image by other code.

One preferred method of implementing the present invention in the Internet environment is to use JavaScript which is supported by current versions of Netscape and Microsoft browsers. (JavaScript commands are recognized and executed by Internet Explorer as JScript commands.) Alternatively, an object-oriented language such as Java may be used. Java applet tags can implement all or most of the functions described herein, although additional or alternate programming code may be required.

As background to the Internet implementation, JavaScript code may be transmitted with a web page for subsequent action by the user's browser. JavaScript is identified by a script tag, which is followed by program code and associated comments. When the browser detects the script tag, it captures the code and implements it at the appropriate time. A JavaScript file may have the following general configuration:

```
<SCRIPT>
COMMENT
code
code
COMMENT
code
code
<SCRIPT> (end of JavaScript)
```

Some examples of code, described functionally, which are useful for the present invention are as follows:
1. Look for an "unload event" indicating that the browser has left the current page and has found the site of a newly requested page.
2. Look for a click event (i.e., a user click on a hypertext link)
3. Open a window on the display screen.
4. Retrieve a desired (named) image file from cache.
5. Size and place the image file on the display screen.

6. Start a timer to close a window after a preset time period (i.e., timer=x sec.).
7. Override the timer and keep the window open.

Figure 16:
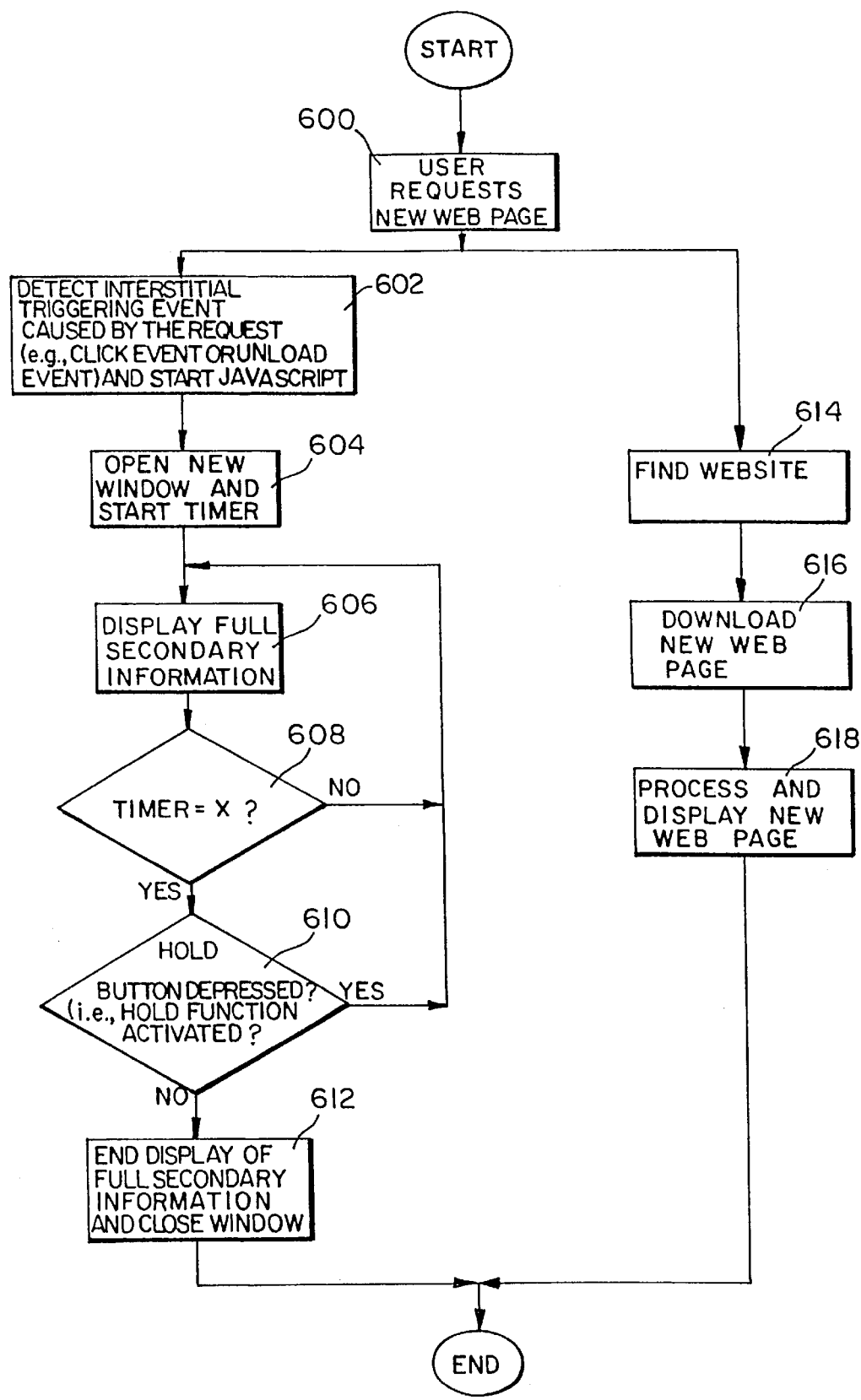
FIG. 16 is a functional flowchart of an Internet implementation of the present invention.
Figure 17:
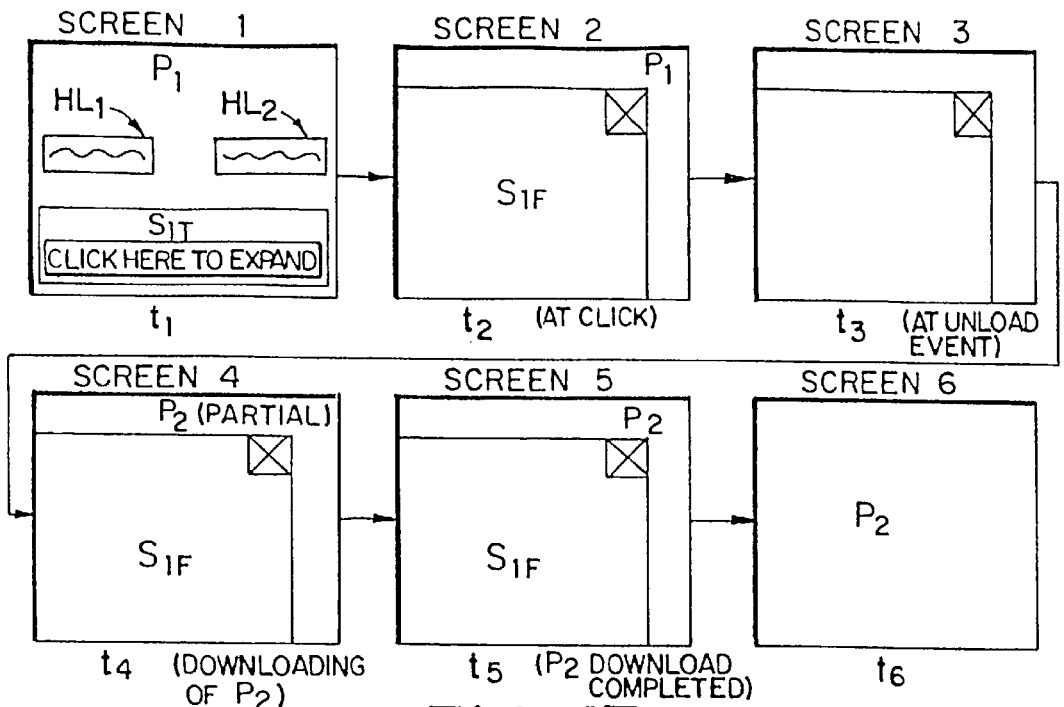
FIG. 17 shows sample screen displays which appear as a result of implementing the steps of FIG. 16.

FIG. 16 is a functional flowchart of an Internet implementation of the present invention, and FIG. 17 has sample display screens 1–6 shown to illustrate the steps of the process. Referring to FIGS. 16 and 17, consider an initial display screen at time $t_1$ which shows primary information $P_1$, two hypertext links, $HL_1$ and $HL_2$, and a thumbnail image $S_{1T}$. In this example, the thumbnail image $S_{1T}$ was transmitted from a website as a 4K file and stored locally as a 4K file in the cache. (No larger or more detailed version of the thumbnail image was downloaded from any web site.)

The first step in the process is that the user requests to see a new web page $P_2$ (step 600). Next, an interstitial triggering event is detected (step 602) and the previously downloaded JavaScript code is started for displaying the full secondary information. Using current browsers, this event may be detected by the occurrence of an "unload event" indicating that the browser has left the current page and has found the site of a newly requested page, or by the occurrence of a click event (i.e., a user click on a hypertext link). If the user employs a plug-in or if modifications are made to existing browsers, other triggering events may be used, such as selection of a bookmarked site or selection of the forward or backward site button of the browser. To maximize the use of interstitial space when using current browsers (i.e., to ensure that the full secondary information is displayed as soon as the user has indicated a desire to leave the current web page), the click event is preferred over the unload event when a choice is available between the two, since there is a finite time between a click event and the unload event. The display screens in FIG. 17 presume that the click event is the interstitial triggering event detected in step 602.

Upon detection of the interstitial triggering event, the JavaScript code opens a new window on the display screen and starts an image timer (step 604). The image to be used for the full secondary information is retrieved from cache, sized and manipulated by associated JavaScript code and/or by the browser, and displayed at time $t_2$ as $S_{1F}$ (step 606). The time period from the interstitial triggering event to time $t_2$ is very quick, since $S_{1T}$ is retrieved directly from cache, not from a remote location. JavaScript may use the "document.write" commands to write images using image tags to the new window. Of course, since the thumbnail image $S_{1T}$ is in the cache, no actual retrieval from a website occurs. The JavaScript code merely indicates the size at which $S_{1T}$ is to be displayed (e.g., height and width in pixel counts), and then the automatic browser capabilities, such as their extrapolation capabilities, perform such functions directly on $S_{1T}$ to obtain $S_{1F}$. Alternatively, browser capabilities may be combined with JavaScript image manipulation code to most efficiently create the full secondary information. The particular implementation of step 606 depends upon the capabilities of the browser, the ability to selectively suppress automatic browser capabilities, and the amount and sophistication of JavaScript code which is used to manipulate the secondary information.

In the case where $S_{1T}$ is not a thumbnail image, but instead is a keyhole image or a banner image, step 606 will include the function of retrieving from the cache the previously downloaded full image behind the keyhole, or the full image related to, but different in content from, the banner image. Of course, each of these images would have been previously downloaded using another image tag or, in the case of the keyhole image, a portion of an image tag.

Referring to FIG. 16, the flowchart has a separate (right) branch for the web page retrieval which is independent of the functions on the left branch being implemented by the JavaScript code. Since Javascript cannot detect the completion of a download of a new web page when run on current Netscape and Microsoft browsers (without plug-ins or the like), there cannot be any interactivity between the left and right branches. Of course, as discussed extensively above and below, such interactivity may be added by using a plug-in, creating an ActiveX control for providing the interactivity, or selecting a browser which provides such a capability.

FIG. 17 shows display screens as they would appear if the interstitial triggering event is a click event. Also, during times $t_1$–$t_5$, it is presumed that the timer has not yet timed out, or that the user or the user's computer has activated the hold function. Thus, at time $t_2$, web page $P_1$ remains on the display, overlapped by the interstitial display window. When the unload event occurs, $P_1$ disappears and there is blank screen space in the viewable area behind the window. As the new web page $P_2$ begins to download, portions of it may be seen filling in the non-overlapped areas of the screen display, as shown at time $t_4$. At time $t_5$, the download of $P_2$ is completed. Some browsers do not show partial screen displays as web pages are being downloaded. When using these browsers, there would be no intermediary display screen 4.

Referring again to FIGS. 16 and 17, if the timer for the full secondary information times out and no hold button or hold function was activated ("YES" output from decision block of step 608, and NO" output from decision block 610), then $S_{1F}$ automatically disappears, and is replaced by either (1) additional full secondary information (if additional secondary information was previously downloaded to do so), (2) web page $P_1$ if the unload event has not yet occurred, (3) a blank screen if the unload event has occurred, or (4) web page $P_2$ if the downloading of $P_2$ is completed. Screen 6 shows the display after web page $P_2$ is downloaded, and after $S_{1F}$ disappears either automatically or through action by the user.

If the timer for the display of full secondary information has not yet timed out ("NO" output from decision block of step 608), the full secondary information remains on the display screen. If the JavaScript code allows the user to interact with the window, the user may choose to close the window for $S_{1F}$ by clicking on the box in the upper right-hand corner of the $S_{1F}$ window. Alternatively, the JavaScript code may be programmed to work with the browser and operating system to allow $S_{1F}$ to remain displayed after receipt of the new web page $P_2$, entirely covering the new web page $P_2$ or partly overlapping the new web page $P_2$, thereby requiring the user to close the window for $S_{1F}$ to see the new web page $P_2$, or to wait for the timer to time out and automatically delete $S_{1F}$ to see the new web page $P_2$. As discussed above, the limitations regarding "persistence" of code when using current browsers will determine which display options are available to the user. For example, if the user wishes to completely obscure the new web page $P_2$ using JavaScript running with current Netscape and Microsoft browsers, the window for display of secondary information must be sized to cover all portions of the display screen used for showing web pages.

Referring again to FIG. 16, the steps of finding the new website, downloading the new web page, and processing and displaying the web page (steps 614, 616 and 618) occur independently of the functions implemented by the JavaScript code.

If at time $t_1$, the user wishes to immediately see $S_{1F}$ without leaving the current website, a different interstitial triggering event and code must be inserted into the web page $P_1$. One preferred technique for implementing this capability is to include an additional link tag with the HTML web page associated with $S_{1T}$, as follows:

```
<A HREF="javascript:showInterstitial()"
text or image tag
</A>
```

An alternative, but less preferred command, is the following:

```
<A onClick="showInterstitial()" HREF="javascript:void(0)">
text or image tag
</A>
```

The command "showInterstitial( )" is a function call to previously downloaded JavaScript to retrieve and expand $S_{1T}$ to obtain the full secondary information $S_{1F}$, and thereby go to step 606 in the flowchart of FIG. 16 without retrieving a new web page. The text may be a phrase such as "Click here to expand", as shown in screen 1 of FIG. 16, and which is displayed in a highlighted manner. The image tag may be an icon or the like which the user may click on.

To most efficiently execute the Internet embodiment of the present invention, the individual websites which send requested primary information do not store all of the JavaScript which is necessary for manipulating secondary information (and may not store the secondary information either). Instead, a website that wants to include secondary information with its web page may send HTML commands which call an image file located somewhere else on the web that contains the secondary information (i.e., the information which is displayed simultaneously with the primary information, as well as the information displayed during the interstitial space). The website also sends another command which calls another web address that contains most of the JavaScript code (including the image manipulation software) for displaying and manipulating the secondary information.

Figure 18:
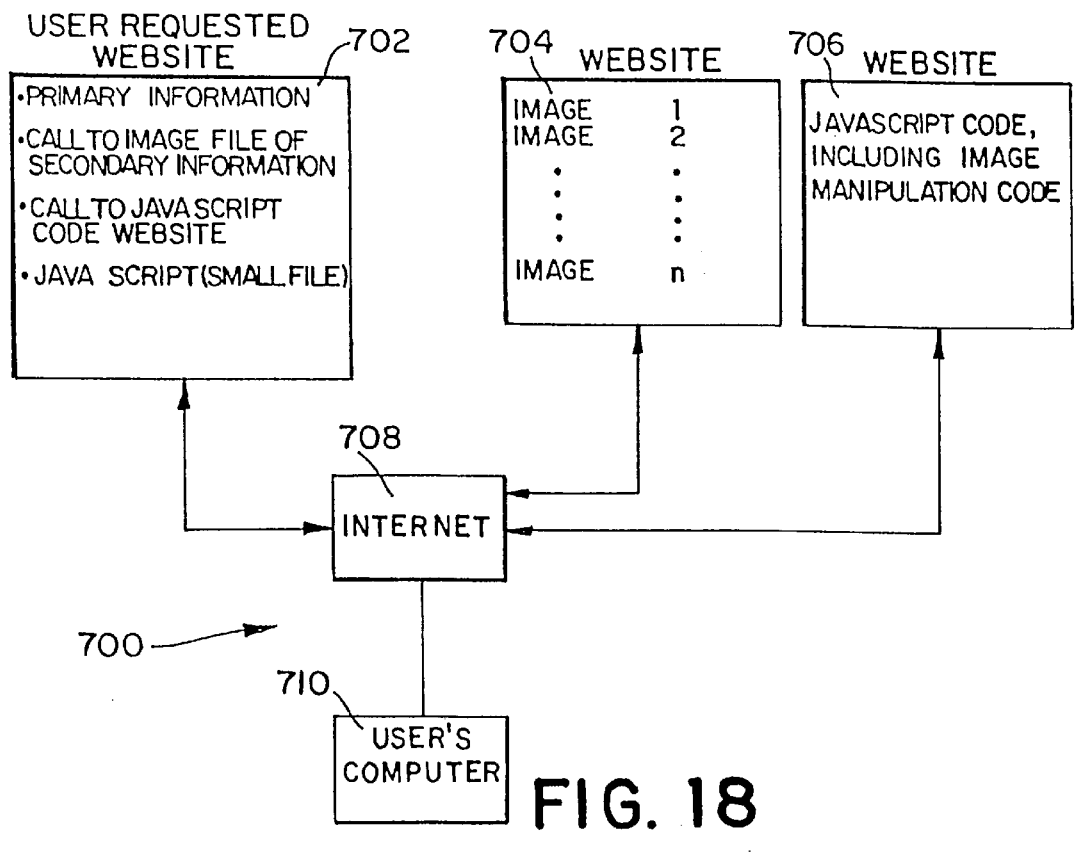
FIG. 18 is a schematic representation of one embodiment of an Internet implementation of the present invention.

FIG. 18 shows a schematic diagram 700 of this scheme. Each website 702 that has agrees to include secondary information with its web page contains its primary information, a call to an image file of secondary information possibly stored at a different website 704, a call to a JavaScript code web site 706, and a small file of JavaScript code for manipulation of the secondary information. The information and code obtained from all of the websites 702, 704 and 706 are sent through the Internet 708 to the user's computer 710. The first time that the user encounters a website which includes secondary information, it is necessary to download and cache the JavaScript code in the user's computer 710. As long as the JavaScript code remains in the user's cache, no additional retrievals from website 706 are made as additional sites which send secondary information and the calls are received at the user's computer. This process minimizes downloading time, particularly if the JavaScript code is extensive. More complex embodiments of the present invention, such as those using interactive secondary information would require larger files of JavaScript code.

Alternative schemes are within the scope of the present invention. If only a small amount of JavaScript code is necessary to process the secondary information, then it may be sent directly by the user requested website 702. If a plug-in is used, then the code for processing the secondary information resides permanently in the user's computer, and no call to the website 706 would be necessary.

One advantage of the scheme shown in FIG. 18 is that the website 704 may exercise complete or partial control over the content of secondary information. For example, each website 702 of primary information can make the same exact call to the website 704, and the website 704 can selectively insert the desired secondary information based on any preprogrammed criteria. For example, the website 704 could cycle through a plurality of advertisements.

Plug-in Implementation of Code for Manipulating Secondary Information

A plug-in embodiment of the present invention may recognize secondary information embedded as objects in a web page HTML (such as embedded in ShockWave™ movies), preview them as thumbnails and redisplay them automatically during the interstitial space, or upon direct request.

In addition, another plug-in embodiment reserves a portion of the screen, such as the bottom 70 pixels of the screen (about ¾ inch) for displaying thumbnails or banners, while the rest of the screen displays web pages downloaded by the browser. This plug-in can display secondary information embedded in the web page (as described above) but can also download secondary information of its own "choosing" (i.e., from some pre-specified web site during the machine wait time, even if (and especially if) no secondary information is embedded in or associated with the web page currently displayed by the browser. This secondary information is displayed in thumbnail or banner form in the bottom 70 reserved pixels. Upon direct request by the user, or automatically during the interstitial space, the full secondary information is displayed in a new window created by the plug-in. Secondary information not displayed in one interstitial space can be stored by the plug-in until the next interstitial space and then displayed, because the plug-in has "persistence" and the ability to write to the user's hard drive.

For example, the Pointcast netcasting system provides a screen saver with news downloaded from the web. It does not provide interstitials, but it provides the option of a browsing window surrounded by advertisements and banners selected by Pointcast. Pointcast downloads information from the web and stores it on the hard drive. A similar type of interface is within the scope of the present invention, wherein an interstitial triggering event is detected by code, and causes a window to open to show secondary information during the interstitial space. The secondary information would be full secondary information related to the advertisements or banners shown around a Pointcast-like browsing window. The process would be essentially similar to that shown in FIG. 16.

A plug-in offers more flexibility than using Java or JavaScript code with current browsers. A plug-in would allow more interstitial triggering events to be detected, such as clicking on the back or forward page icons or clicking on a website from a bookmark. A plug-in could also offer more control over detection of receipt of a new web page (e.g., look for condition of "no downloading activity in last five seconds") for triggering changes to the full secondary information displays. A plug-in would also allow for exact positioning of windows and more control over the screen when opening windows and the like. A plug-in would also allow for more control over the operating system. A plug-in embodiment would have some disadvantages. For example, plug-in must have different code for each operating system. Plug-ins add complexity to the user's computer. Also, users must agree to download a plug-in to implement its functions.

From the foregoing description, it can be seen that the present invention comprises an apparatus for displaying primary and secondary information and for filtering the same. It will be recognized by those skilled in the art that changes may be made to the above-described embodiment of the invention without departing from the broad inventive concepts thereof It is understood, therefore, that this invention is not limited to the particular embodiment disclosed, but is intended to cover all modifications which are within the spirit and scope of the invention as defined by the appended claims.

What is claimed is:

1. A method of displaying information at a display of a local user computer, the information including primary information representing information requested by a user and secondary information representing additional information, the method comprising:
   (a) requesting retrieval of primary information from a first information memory device, wherein there is a delay period between the request time and the time in which the primary information is available for display;
   (b) retrieving secondary information from a second information memory device;
   (c) storing the primary and secondary information in a local storage device of the user's computer;
   (d) simultaneously displaying the primary information and a portion of the secondary information on the user's display;
   (e) requesting retrieval of subsequent primary information;
   (f) displaying a full display of the secondary information in place of the primary information in at least a portion of the delay time which occurs during retrieval of the subsequent primary information; and
   (g) displaying the subsequently requested information after receipt thereof.

2. The method according to claim 1 wherein the secondary information includes a partial screen file of image information and a related full screen file of image information, wherein step (d) includes displaying the partial screen file of image information as the portion of secondary information which is simultaneously displayed with the primary image, and step (f) includes displaying the related full screen file of image information in place of the primary information and partial screen file during the delay time which occurs during retrieval of the subsequent primary information.

3. The method according to claim 2 wherein the secondary information is interactive secondary information, the method further including:
   (h) interacting with the partial screen file of image information prior to step (e); and
   (i) forming the contents of the related full screen file of image information based upon user interaction with the partial screen file of image information.

4. The method according to claim 2 wherein the partial screen file is a banner image.

5. The method according to claim 1 further comprising:
   (h) initiating a timer when step (e) begins; and
   (i) deleting the full display of the secondary information when the timer reaches a predetermined time.

6. The method according to claim 5 further comprising:
   (j) initiating a hold function to hold the secondary information on the display after the timer reaches the predetermined time.

7. The method according to claim 1 wherein step (d) includes displaying a thumbnail image of the secondary information as the portion of secondary information which is simultaneously displayed with the primary image.

8. The method according to claim 1 wherein step (d) includes displaying a keyhole image of the secondary information as the portion of secondary information which is simultaneously displayed with the primary image.

9. The method according to claim 1 wherein the secondary information is an advertisement.

10. The method according to claim 1 wherein the subsequent primary information is processed or rendered initial primary information, step (e) is the initiation of the processing or rendering of the initial primary information, and step (f) occurs during the processing or rendering of the initial primary information.

11. The method according to claim 1 wherein the user's computer includes a filter for selectively blocking the display of secondary information in step (f), the method further comprising:
    (h) detecting the request for retrieval of subsequent primary information, and using the filter to prevent step (f) from occurring upon detection thereof.

12. A method according to claim 1 wherein step (c) includes storing the primary and secondary information in cache memory of the user's computer.

13. A method of displaying information retrieved from one or more remote sources at a display of a local computer, the information including primary information representing information content requested by a user and secondary information representing additional information, the primary and secondary information being stored at one or more of the remote sources, the method comprising:
    (a) requesting retrieval of primary information from one or more of the remote sources, wherein there is a delay period between the request time and the time in which the requested primary information is available for display;
    (b) sending the requested primary information along with secondary information, the secondary information being retrieved from at least one of the remote sources;
    (c) storing the primary and secondary information in a local storage device of the user's computer;
    (d) simultaneously displaying the primary information and a portion of the secondary information on a display, the display being connected to the storage device;
    (e) requesting retrieval of subsequent primary information from one or more of the remote sources;
    (f) displaying a full display of the secondary information in place of the primary information in at least a portion of the delay time which occurs during retrieval of the subsequent primary information; and
    (g) displaying at least the subsequently requested primary information after receipt thereof.

14. The method according to claim 13 wherein the one or more remote sources are a plurality of websites, and step (a) includes requesting retrieval of the primary information from a first website and requesting retrieval of the secondary information from another website.

15. The method according to claim 14 further comprising:
    (h) embedding call commands in primary information to retrieve the secondary information from one or more other websites.

16. The method according to claim 14 further comprising:
    (h) embedding call commands in primary information to retrieve programming code from another website for processing and controlling the display of the secondary information.

17. A method of displaying information retrieved from one or more remote sources at a display of a local user computer, the information including primary information representing information content requested by a user and secondary information representing additional information, the primary and secondary information being stored at one or more of the remote sources, the method comprising:

(a) requesting retrieval of primary information from one or more of the remote sources;

(b) sending the requested primary information along with secondary information, the secondary information being retrieved from at least one of the remote sources;

(c) storing the primary and secondary information in a local storage device of the user's computer;

(d) simultaneously displaying the primary information and a portion of the secondary information on a display, the display being connected to the storage device; and (e) displaying a full display of the secondary information in place of the primary information upon user request of the full secondary information.

18. A computer readable medium whose contents cause information to be displayed at a local user computer, the information including primary information representing information requested by a user and secondary information representing additional information, by performing the steps of:

(a) requesting retrieval of primary information from a first information memory device, wherein there is a delay period between the request time and the time in which the primary information is available for display;

(b) retrieving secondary information from a second information memory device;

(c) storing the primary and secondary information in a local storage device of the user's computer;

(d) simultaneously displaying the primary information and a portion of the secondary information on the user's display;

(e) requesting retrieval of subsequent primary information;

(f) displaying a full display of the secondary information in place of the primary information in at least a portion of the delay time which occurs during retrieval of the subsequent primary information; and (g) displaying the subsequently requested information after receipt thereof.

19. The computer readable medium according to claim 18 wherein the secondary information includes a partial screen file of image information and a related full screen file of image information, wherein step (d) includes displaying the partial screen file of image information as the portion of secondary information which is simultaneously displayed with the primary image, and step (f) includes displaying the related full screen file of image information in place of the primary information and partial screen file during the delay time which occurs during retrieval of the subsequent primary information.

20. The computer readable medium according to claim 19 wherein the secondary information is interactive secondary information, the computer readable medium further performing the steps of:

(h) interacting with the partial screen file of image information prior to step (e); and (i) forming the contents of the related full screen file of image information based upon user interaction with the partial screen file of image information.

21. The computer readable medium according to claim 19 wherein the partial screen file is a banner image.

22. The computer readable medium according to claim 18 further performing the steps of:

(h) initiating a timer when step (e) begins; and (i) deleting the full display of the secondary information when the timer reaches a predetermined time.

23. The computer readable medium according to claim 22 further performing the steps of:

(j) initiating a hold function to hold the secondary information on the display after the timer reaches the predetermined time.

24. The computer readable medium according to claim 18 wherein step (d) includes displaying a thumbnail image of the secondary information as the portion of secondary information which is simultaneously displayed with the primary image.

25. The computer readable medium according to claim 18 wherein step (d) includes displaying a keyhole image of the secondary information as the portion of secondary information which is simultaneously displayed with the primary image.

26. The computer readable medium according to claim 18 wherein the secondary information is an advertisement.

27. The computer readable medium according to claim 18 wherein the subsequent primary information is processed or rendered initial primary information, step (e) is the initiation of the processing or rendering of the initial primary information, and step (f) occurs during the processing or rendering of the initial primary information.

28. The computer readable medium according to claim 18 wherein the user's computer includes a filter for selectively blocking the display of secondary information in step (f), the computer readable medium further performing the steps of:

(h) detecting the request for retrieval of subsequent primary information, and using the filter to prevent step (f) from occurring upon detection thereof.

29. The computer readable medium according to claim 18 wherein step (c) includes storing the primary and secondary information in cache memory of the user's computer.

30. The computer readable medium of displaying information retrieved from one or more remote sources at a display of a local computer, the information including primary information representing information content requested by a user and secondary information representing additional information, the primary and secondary information being stored at one or more of the remote sources, the computer readable medium further performing the steps of:

(a) requesting retrieval of primary information from one or more of the remote sources, wherein there is a delay period between the request time and the time in which the requested primary information is available for display;

(b) sending the requested primary information along with secondary information, the secondary information being retrieved from at least one of the remote sources;

(c) storing the primary and secondary information in a local storage device of the user's computer;

(d) simultaneously displaying the primary information and a portion of the secondary information on a display, the display being connected to the storage device;

(e) requesting retrieval of subsequent primary information from one or more of the remote sources;

(f) displaying a full display of the secondary information in place of the primary information in at least a portion of the delay time which occurs during retrieval of the subsequent primary information; and (g) displaying at least the subsequently requested primary information after receipt thereof.

31. The computer readable medium according to claim 30 wherein the one or more remote sources are a plurality of websites, and step (a) includes requesting retrieval of the primary information from a first website and requesting retrieval of the secondary information from another website.

32. The computer readable medium according to claim 31 further performing the step of:

(h) embedding call commands in primary information to retrieve the secondary information from one or more other websites.

33. The computer readable medium according to claim 31 further performing the step of:

(h) embedding call commands in primary information to retrieve programming code from another website for processing and controlling the display of the secondary information.

34. The computer readable medium of displaying information retrieved from one or more remote sources at a display of a local user computer, the information including primary information representing information content requested by a user and secondary information representing additional information, the primary and secondary information being stored at one or more of the remote sources, the computer readable medium further performing the steps of:

(a) requesting retrieval of primary information from one or more of the remote sources;

(b) sending the requested primary information along with secondary information, the secondary information being retrieved from at least one of the remote sources;

(c) storing the primary and secondary information in a local storage device of the user's computer;

(d) simultaneously displaying the primary information and a portion of the secondary information on a display, the display being connected to the storage device; and (e) displaying a full display of the secondary information in place of the primary information upon user request of the full secondary information.

35. An apparatus for displaying information at a display of a local user computer, the information including primary information representing information requested by a user and secondary information representing additional information, the apparatus comprising:

(a) means for requesting retrieval of primary information from a first information memory device, wherein there is a delay period between the request time and the time in which the primary information is available for display;

(b) means for retrieving secondary information from a second information memory device;

(c) a local storage device of the user's computer for storing the primary and secondary information therein;

(d) means for simultaneously displaying the primary information and a portion of the secondary information on the user's display;

(e) means for requesting retrieval of subsequent primary information;

(f) means for displaying a full display of the secondary information in place of the primary information in at least a portion of the delay time which occurs during retrieval of the subsequent primary information; and (g) means for displaying the subsequently requested information after receipt thereof.

36. The apparatus according to claim 35 wherein the secondary information includes a partial screen file of image information and a related full screen file of image information, wherein the means for simultaneously displaying displays the partial screen file of image information as the portion of secondary information which is simultaneously displayed with the primary image, and the means for displaying a full display displays the related full screen file of image information in place of the primary information and partial screen file during the delay time which occurs during retrieval of the subsequent primary information.

37. The apparatus according to claim 36 wherein the secondary information is interactive secondary information, the apparatus further including:

(h) means for interacting with the partial screen file of image information prior to requesting retrieval of subsequent primary information; and (i) means for forming the contents of the related full screen file of image information based upon user interaction with the partial screen file of image information.

38. The apparatus according to claim 36 wherein the partial screen file is a banner image.

39. The apparatus according to claim 35 further comprising:

(h) means for initiating a timer upon initiation of a request for retrieval of primary information; and (i) means for deleting the full display of the secondary information when the timer reaches a predetermined time.

40. The apparatus according to claim 39 further comprising:

(j) means for initiating a hold function to hold the secondary information on the display after the timer reaches the predetermined time.

41. The apparatus according to claim 35 wherein the means for simultaneously displaying displays a thumbnail image of the secondary information as the portion of secondary information which is simultaneously displayed with the primary image.

42. The apparatus according to claim 35 wherein the means for simultaneously displaying displays a keyhole image of the secondary information as the portion of secondary information which is simultaneously displayed with the primary image.

43. The apparatus according to claim 35 wherein the secondary information is an advertisement.

44. The apparatus according to claim 35 wherein the subsequent primary information is processed or rendered initial primary information, the request for retrieval of subsequent primary information is the initiation of the processing or rendering of the initial primary information, and the displaying of a full display of secondary information in place of the primary information occurs during the processing or rendering of the initial primary information.

45. The apparatus according to claim 35 wherein the user's computer includes a filter for selectively blocking the display of secondary information in place of the primary information, the apparatus further comprising:

(h) means for detecting the request for retrieval of subsequent primary information, the filter being used to prevent displaying of the full display of the secondary information in place of the primary information from occurring upon detection thereof.

46. The apparatus according to claim 35 wherein the local storage device of the user's computer is cache memory.

47. An apparatus for displaying information retrieved from one or more remote sources at a display of a local computer, the information including primary information representing information content requested by a user and secondary information representing additional information, the primary and secondary information being stored at one or more of the remote sources, the apparatus comprising:

(a) means for requesting retrieval of primary information from one or more of the remote sources, wherein there is a delay period between the request time and the time in which the requested primary information is available for display;

(b) means for sending the requested primary information along with secondary information, the secondary information being retrieved from at least one of the remote sources;

(c) a local storage device of the user's computer for storing the primary and secondary information;

(d) means for simultaneously displaying the primary information and a portion of the secondary information on a display, the display being connected to the storage device;

(e) means for requesting retrieval of subsequent primary information from one or more of the remote sources;

(f) means for displaying a full display of the secondary information in place of the primary information in at least a portion of the delay time which occurs during retrieval of the subsequent primary information; and (g) means for displaying at least the subsequently requested primary information after receipt thereof.

48. The apparatus according to claim 47 wherein the one or more remote sources are a plurality of websites, and the means for requesting retrieval of primary information requests retrieval of the primary information from a first website and requests retrieval of the secondary information from another website.

49. The apparatus according to claim 48 further comprising:

(h) means for embedding call commands in primary information to retrieve the secondary information from one or more other websites.

50. The apparatus according to claim 48 further comprising:

(h) means for embedding call commands in primary information to retrieve programming code from another website for processing and controlling the display of the secondary information.

51. An apparatus for displaying information retrieved from one or more remote sources at a display of a local user computer, the information including primary information representing information content requested by a user and secondary information representing additional information, the primary and secondary information being stored at one or more of the remote sources, the apparatus comprising:

(a) means for requesting retrieval of primary information from one or more of the remote sources;

(b) means for sending the requested primary information along with secondary information, the secondary information being retrieved from at least one of the remote sources;

(c) a local storage device of the user's computer for storing the primary and secondary information;

(d) means for simultaneously displaying the primary information and a portion of the secondary information on a display, the display being connected to the storage device; and (e) means for displaying a full display of the secondary information in place of the primary information upon user request of the full secondary information.

* * * * *